US009400185B2

(12) United States Patent
Tanaka et al.

(10) Patent No.: US 9,400,185 B2
(45) Date of Patent: Jul. 26, 2016

(54) DESTINATION PREDICTION APPARATUS

(71) Applicants: Kouhei Tanaka, Tokyo (JP); Masaya Akihara, Tokyo (JP); Mitsuo Shimotani, Tokyo (JP); Toshio Kawagishi, Tokyo (JP); Naoki Shimizu, Tokyo (JP)

(72) Inventors: Kouhei Tanaka, Tokyo (JP); Masaya Akihara, Tokyo (JP); Mitsuo Shimotani, Tokyo (JP); Toshio Kawagishi, Tokyo (JP); Naoki Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/760,898

(22) PCT Filed: Jan. 21, 2013

(86) PCT No.: PCT/JP2013/051089
§ 371 (c)(1),
(2) Date: Jul. 14, 2015

(87) PCT Pub. No.: WO2014/112124
PCT Pub. Date: Jul. 24, 2014

(65) Prior Publication Data
US 2015/0345970 A1    Dec. 3, 2015

(51) Int. Cl.
*G01C 21/34* (2006.01)
*G01C 21/36* (2006.01)

(52) U.S. Cl.
CPC ............ *G01C 21/3484* (2013.01); *G01C 21/36* (2013.01); *G01C 21/3617* (2013.01)

(58) Field of Classification Search
CPC . G01C 21/36; G01C 21/3617; G01C 21/3484
USPC ......................................................... 701/521
See application file for complete search history.

(56) References Cited

U.S. PATENT DOCUMENTS

| | | | |
|---|---|---|---|
| 7,856,311 B2 | 12/2010 | Matsuura et al. | |
| 2009/0157291 A1 | 6/2009 | Kudo et al. | |
| 2012/0010955 A1* | 1/2012 | Ramer | G06Q 30/02 705/14.46 |
| 2012/0271717 A1* | 10/2012 | Postrel | G06Q 30/02 705/14.58 |
| 2012/0290950 A1* | 11/2012 | Rapaport | H04L 51/32 715/753 |
| 2013/0196601 A1* | 8/2013 | Bobrow | H04B 7/24 455/41.2 |
| 2013/0330008 A1* | 12/2013 | Zadeh | G06N 7/02 382/195 |
| 2013/0345957 A1* | 12/2013 | Yang | G06N 5/02 701/300 |
| 2015/0245167 A1* | 8/2015 | Bobrow | H04W 4/008 455/41.2 |
| 2015/0331583 A1* | 11/2015 | Zhang | G06F 3/04842 715/825 |
| 2015/0371142 A1* | 12/2015 | Jain | G06F 17/30902 706/52 |
| 2016/0104187 A1* | 4/2016 | Tietzen | G06Q 30/0279 705/14.33 |

FOREIGN PATENT DOCUMENTS

| | | |
|---|---|---|
| JP | 7-83678 A | 3/1995 |
| JP | 2000-222689 A | 8/2000 |
| JP | 2005-100382 A | 4/2005 |
| JP | 2005-283575 A | 10/2005 |
| JP | 2006-145494 A | 6/2006 |
| JP | 2007-93264 A | 4/2007 |
| JP | 2007-271480 A | 10/2007 |
| JP | 2009-36594 A | 2/2009 |
| JP | 2010-38785 A | 2/2010 |
| JP | 2011-154004 A | 8/2011 |
| WO | WO 2004/075137 A1 | 9/2004 |

* cited by examiner

*Primary Examiner* — McDieunel Marc
*Assistant Examiner* — James E Stroud
(74) *Attorney, Agent, or Firm* — Birch, Stewart, Kolasch & Birch, LLP

(57) ABSTRACT

It is an object of the present invention to predict a destination easily, and a destination display method for displaying a predicted destination. The destination prediction apparatus of the present invention includes: a behavior history acquiring unit that acquires, the behavior history; a visit history acquiring unit that acquires the visit history; a similar behavior date-and-time extractor that performs a similarity determination between a behavior within a predetermined period prior to a present date and time and a behavior in another period with reference to the behavior history and that extracts a date and time of the behavior in another period determined to be similar as a similar behavior date and time from the behavior history; and a destination candidate extractor that extracts, as a destination candidate, a location visited within a predetermined period before or after the similar behavior date and time from the visit history.

20 Claims, 17 Drawing Sheets

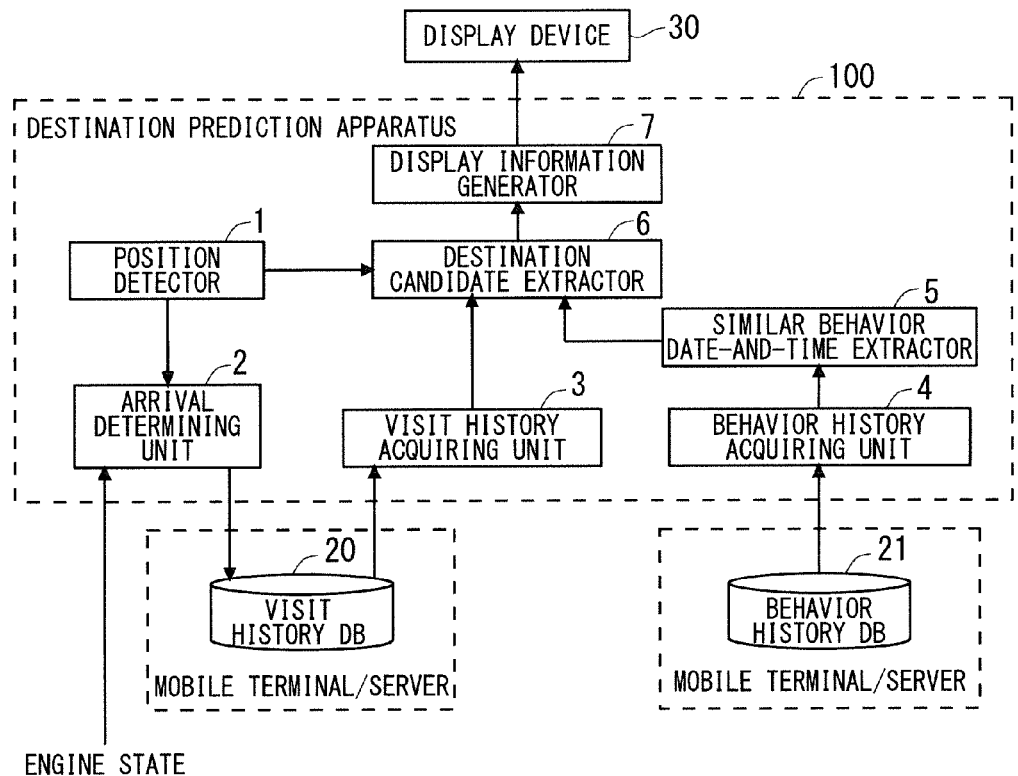

FIG. 3

| DATE AND TIME |
|---|
| 2012/09/07 13:00 |
| 2012/08/29 13:00 |

F I G. 4

| DEPARTURE DATE AND TIME | ARRIVAL DATE AND TIME | LATITUDE | LONGITUDE | |
|---|---|---|---|---|
| 2012/09/08 16:30 | 2012/09/08 18:00 | 34.000 | 135.500 | |
| 2012/09/08 6:00 | 2012/09/08 7:30 | 34.800 | 134.500 | |
| 2012/09/07 17:00 | 2012/09/07 18:00 | 34.000 | 135.500 | → LOCATION 1 |
| 2012/09/07 12:00 | 2012/09/07 12:50 | 34.700 | 135.678 | → LOCATION 2 |
| .. | .. | .. | .. | |
| 2012/08/29 15:00 | 2012/08/29 16:00 | 34.000 | 135.500 | |
| 2012/08/29 12:00 | 2012/08/29 13:00 | 34.700 | 135.678 | |

F I G. 5
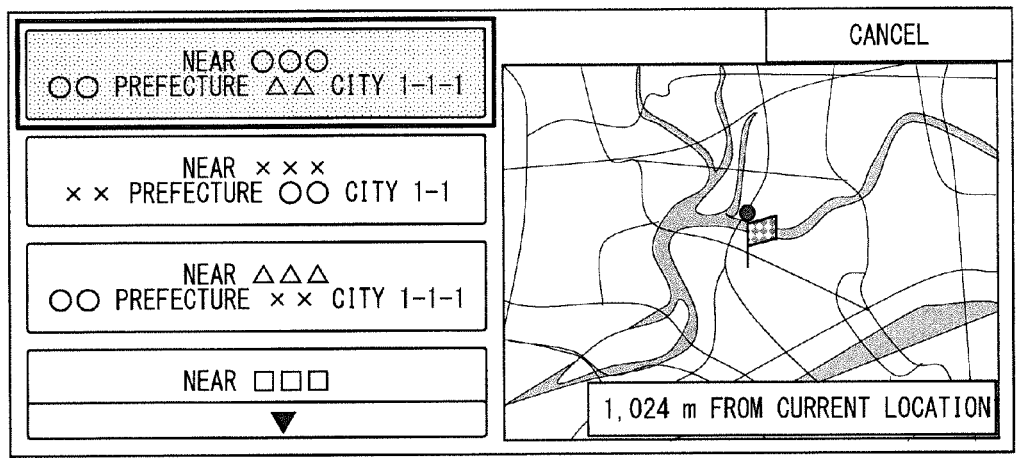
F I G. 6
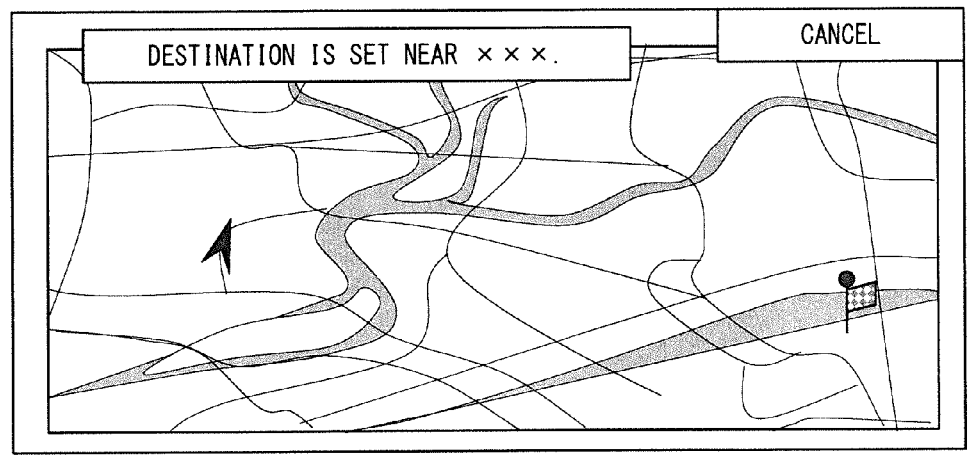

FIG. 9

| DATE AND TIME | URL | TITLE |
|---|---|---|
| 2012/09/20 12:00 | http://aaa.bbb.ccc/xxx | bbb TRAFFIC INFORMATION |
| 2012/09/20 11:00 | http://ddd.eee.fff/xxx | eee NEWS |
| 2012/09/20 9:00 | http://ggg.hhh.iii/xxx | SCHEDULE |
| : | : | : |
| 2012/09/07 11:00 | http://aaa.bbb.ccc/yyy | bbb TRAFFIC INFORMATION |
| 2012/09/07 9:00 | http://ggg.hhh.iii/yyy | SCHEDULE |
| 2012/09/07 8:30 | http://jjj.kkk.lll/yyy | YYY BLOG |

FIG. 10

| DATE AND TIME | TRANSMITTER | RECEIVER | TEXT |
|---|---|---|---|
| 2012/09/20 12:00 | ddd@eee.fff | aaa@bbb.ccc | I WILL VISIT YOU NOW… |
| 2012/09/19 19:00 | hhh@iii.jjj | ddd@eee.fff | OK. |
| 2012/09/19 18:00 | ddd@eee.fff | hhh@iii.jjj | I WILL GO HOME. |
| : | : | : | : |
| 2012/08/29 12:00 | ddd@eee.fff | aaa@bbb.ccc | I JUST LEFT… |

FIG. 11

| DATE AND TIME | TYPE |
|---|---|
| 2012/09/07 13:00 | SCHEDULE |
| 2012/08/29 13:00 | SCHEDULE |
| 2012/09/07 11:00 | WEB PAGE |
| 2012/09/07 9:00 | WEB PAGE |
| 2012/08/29 12:00 | E-MAIL MESSAGE |

FIG. 12

| DEPARTURE DATE AND TIME | ARRIVAL DATE AND TIME | LATITUDE | LONGITUDE | FACILITY TYPE |
|---|---|---|---|---|
| 2012/09/08 16:30 | 2012/09/08 18:00 | 34.000 | 135.500 | RESIDENTIAL AREA |
| 2012/09/08 6:00 | 2012/09/08 7:30 | 34.800 | 134.500 | GOLF COURSE |
| 2012/09/07 17:00 | 2012/09/07 18:00 | 34.000 | 135.500 | RESIDENTIAL AREA |
| 2012/09/07 12:00 | 2012/09/07 12:50 | 34.700 | 135.678 | BUSINESS DISTRICT |
| : | : | : | : | : |
| 2012/08/29 15:00 | 2012/08/29 16:00 | 34.000 | 135.500 | RESIDENTIAL AREA |
| 2012/08/29 12:00 | 2012/08/29 13:00 | 34.700 | 135.678 | BUSINESS DISTRICT |

FIG. 13

| BEHAVIOR HISTORY DB | DISTRIBUTED POINT |
|---|---|
| SCHEDULE | 50 |
| WEB PAGE HISTORY | 25 |
| HISTORY OF TRANSMISSION AND RECEPTION OF E-MAIL MESSAGES | 25 |

FIG. 14

| LATITUDE | LONGITUDE | NUMBER OF EXTRACTIONS | POINT |
|---|---|---|---|
| 34.000 | 135.500 | 4 | 50 |
| ~~34.700~~ | ~~135.678~~ | ~~4~~ | ~~50~~ |

| LATITUDE | LONGITUDE | NUMBER OF EXTRACTIONS | POINT |
|---|---|---|---|
| 34.700 | 135.678 | 5 | 8 |
| 34.000 | 135.500 | 6 | 7 |
| 34.400 | 135.800 | 4 | 6 |
| 34.600 | 135.000 | 2 | 6 |
| 34.800 | 134.500 | 4 | 5 |

(b)

| FACILITY TYPE | NUMBER OF EXTRACTIONS | POINT |
|---|---|---|
| BUSINESS DISTRICT | 5 | 8 |
| RESIDENTIAL AREA | 6 | 7 |
| GOLF COURSE | 4 | 6 |
| GOLF COURSE | 2 | 6 |
| GOLF COURSE | 4 | 5 |

(c)

| FACILITY TYPE | NUMBER OF EXTRACTIONS | POINT |
|---|---|---|
| BUSINESS DISTRICT | 5 | 8 |
| RESIDENTIAL AREA | 6 | 7 |
| GOLF COURSE | 10 | 17 |

F I G . 2 3

| CAPTION | LATITUDE | LONGITUDE |
|---|---|---|
| GRANDFATHER'S HOUSE | 34.300 | 135.200 |
| BUSINESS TRIP TO COMPANY B | 34.700 | 135.678 |

F I G . 2 4

| URL | TITLE | LATITUDE | LONGITUDE |
|---|---|---|---|
| http://aaa.bbb.ccc/ | bbb TRAFFIC INFORMATION | 34.700 | 135.678 |
| http://ggg.tenki.iii/ | ggg WEATHER FORECAST | 34.300 | 135.200 |

F I G . 2 5

| CAPTION | FACILITY TYPE |
|---|---|
| GOLF | GOLF COURSE |
| SHOPPING | SHOPPING CENTER |

F I G . 2 6
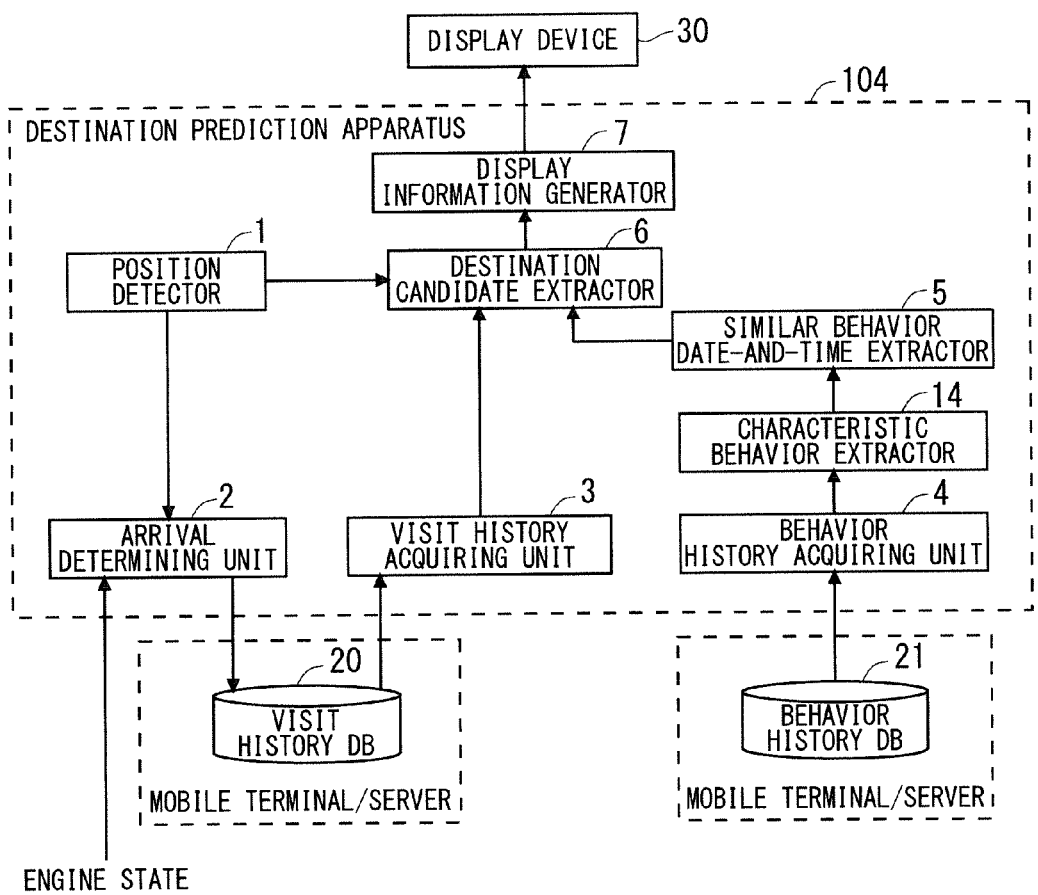

F I G . 2 7
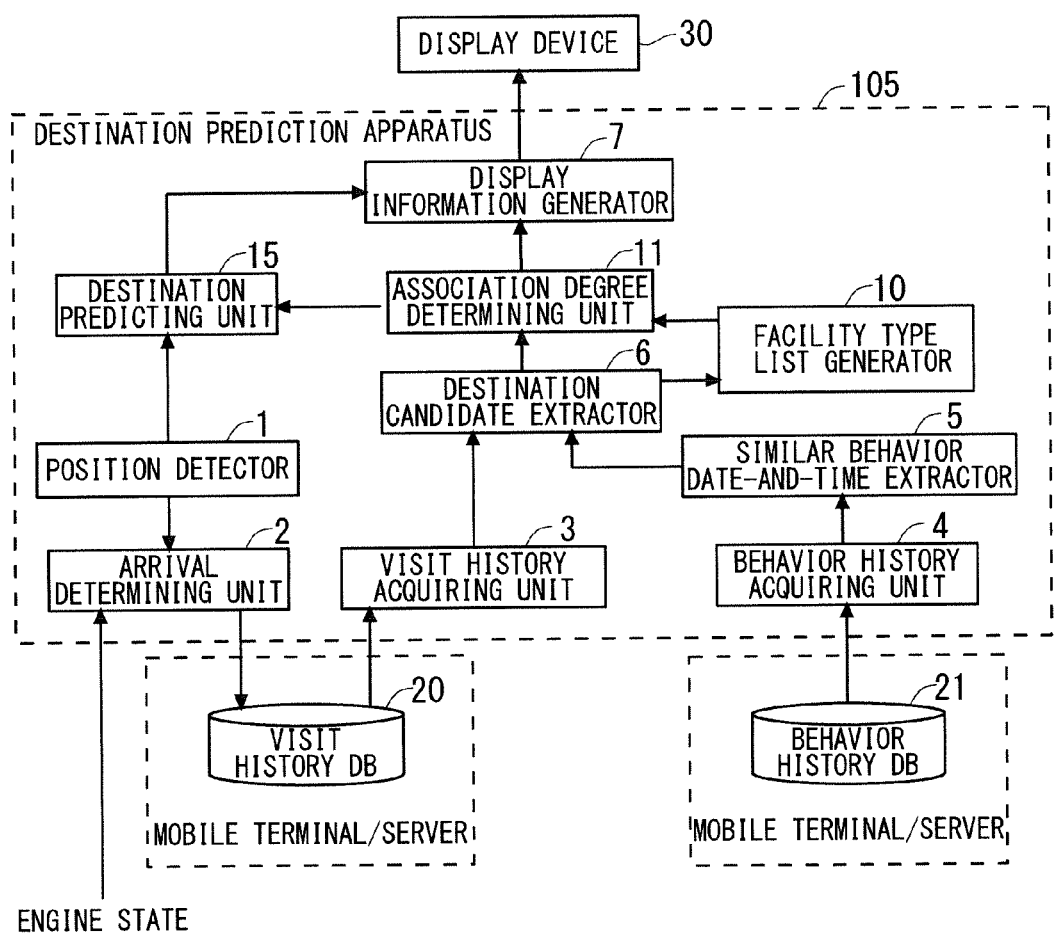

DESTINATION PREDICTION APPARATUS

TECHNICAL FIELD

The present invention relates to an apparatus that predicts a destination or to a method for predicting a destination.

BACKGROUND ART

Vehicle-installed information equipment, such as navigation devices that guide people from a current location to a destination and information providing devices that search for surrounding facilities, is now in widespread use. To utilize many functions of these devices, a latitude and a longitude of a destination need to be input, or a name of a facility associated beforehand with the latitude and the longitude needs to be input.

However, inputting the latitude, the longitude, and the name of the facility is complicated and also time-consuming. Furthermore, a partial-match search for the name of the facility has low accuracy of searching, so that a desired facility cannot be searched in some cases.

For such problems, a technology of predicting a destination using a travel route has been conceived. For example, Patent Document 1 discloses that a travel route is used to predict a destination visited with a high frequency as a destination candidate. Patent Document 2 discloses that a degree of similarity between a movement history and a current travel route is determined on the basis of route points to predict a destination with high accuracy. Patent Document 3 discloses that a degree of similarity between current travel information and past travel information is determined in consideration of differences in a departure point and a day of the week to predict a destination.

However, it is the problem that the above-mentioned technology of predicting the destination using the travel route fails to predict the destination with high accuracy at the stages before and immediately after start of the travel. An increase in the travel route allows for prediction with higher accuracy, but the need for predicting the destination is reduced after approaching the destination. It is also the problem that complicated probability calculation is needed.

As a way of easily setting a destination before start of travel, Patent Document 4 discloses a technology of setting a destination according to belongings. Patent Document 5 discloses a technology of switching a display order of destination candidates according to conditions of a vehicle, conditions outside the vehicle, or the like.

PRIOR ART DOCUMENT

Patent Document

Patent Document 1: Japanese Patent Application Laid-Open No. 7-83678 (1995)
Patent Document 2: Japanese Patent Application Laid-Open No. 2005-283575
Patent Document 3: Japanese Patent Application Laid-Open No. 2007-93264
Patent Document 4: Japanese Patent Application Laid-Open No. 2006-145494
Patent Document 5: Japanese Patent Application Laid-Open No. 2000-222689

SUMMARY OF INVENTION

Problems to be Solved by the Invention

However, the technology in Patent Document 4 identifies the belongings by a tag to predict the destination, so that the destination cannot be predicted without the belongings. Furthermore, a device that reads the belongings in the vehicle is needed, thereby increasing costs.

Patent Document 5 includes a position of a shift lever and a travel speed as the conditions of the vehicle, the presence or absence of a passenger and a room temperature as the conditions inside the vehicle, and the weather and a distance from an oncoming vehicle as the conditions outside the vehicle. However, these parameters do not necessarily fluctuate greatly at each destination, resulting in a problem of prediction accuracy.

The present invention has been made in view of the above mentioned problems, and an object thereof is to provide a destination prediction apparatus and a destination prediction method that easily predict a destination and a destination display method that displays the predicted destination.

Means to Solve the Problems

A destination prediction apparatus of the present invention includes: a behavior history acquiring unit that acquires, from a behavior history database in which a behavior history associating a behavior of a user with a date and time is recorded, the behavior history; a visit history acquiring unit that acquires, from a visit history database (database) in which a visit history associating a visit location of a mobile body with a date and time is recorded, the visit history; a similar behavior date-and-time extractor that performs a similarity determination between a behavior within a predetermined period prior to a present date and time and a behavior in another period with reference to the behavior history and that extracts a date and time of the behavior in another period determined to be similar as a similar behavior date and time from the behavior history; and a destination candidate extractor that extracts, as a destination candidate, a location visited within a predetermined period before or after the similar behavior date and time from the visit history.

A destination prediction method of the present invention includes the steps of: (a) extracting, from a behavior history that associates a behavior of a user with a date and time, a similar behavior date and time that exhibit a behavior similar to a behavior within a predetermined period prior to a present date and time; and (b) extracting, as a destination candidate from a visit history that associates a visit location of a mobile body with a date and time, a location visited within the predetermined period before or after the similar behavior date and time.

A destination display method of the present invention for predicting a destination of a mobile body and displaying the destination on a display unit includes the step of (a) displaying, on the display unit, a destination candidate extracted as a location visited within a predetermined period before or after a similar behavior date and time from a visit history, the similar behavior date and time exhibiting a behavior similar to a behavior within the predetermined period prior to a present date and time. A behavior of an individual associated with a date and time is recorded in the behavior history, and a visit location associated with a date and time is recorded in the visit history.

Effects of the Invention

The destination prediction apparatus of the present invention includes: the behavior history acquiring unit that acquires, from the behavior history database in which the behavior history associating the behavior of the user with the date and time is recorded, the behavior history; the visit history acquiring unit that acquires, from the visit history database in which the visit history associating the visit location of the mobile body with the date and time is recorded, the visit history; the similar behavior date-and-time extractor that performs the similarity determination between the behavior within the predetermined period prior to the present date and time and the behavior in another period with reference to the behavior history and that extracts the date and time of the behavior in another period determined to be similar as the similar behavior date and time from the behavior history; and the destination candidate extractor that extracts, as the destination candidate, the location visited within the predetermined period before or after the similar behavior date and time from the visit history. Therefore, the destination can be easily predicted without a complicated input by the user.

The destination prediction method of the present invention includes the steps of: (a) extracting, from the behavior history that associates the behavior of the user with the date and time, the similar behavior date and time that exhibit the behavior similar to the behavior within the predetermined period prior to the present date and time; and (b) extracting, as the destination candidate from the visit history that associates the visit location of the mobile body with the date and time, the location visited within the predetermined period before or after the similar behavior date and time. Therefore, the destination can be easily predicted without a complicated input by the user.

The destination display method of the present invention for predicting the destination of the mobile body and displaying the destination on the display unit includes the step of (a) displaying, on the display unit, the destination candidate extracted as the location visited within the predetermined period before or after the similar behavior date and time from the visit history, the similar behavior date and time exhibiting the behavior similar to the behavior within the predetermined period prior to the present date and time. The behavior of the individual associated with the date and time is recorded in the behavior history, and the visit location associated with the date and time is recorded in the visit history. Therefore, the destination can be easily predicted and displayed without a complicated input by the user.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram showing a configuration of a destination prediction apparatus in a first embodiment.

FIG. 2 is a diagram showing a behavior history regarding a schedule.

FIG. 3 is a diagram showing an example of data of a similar behavior date and time.

FIG. 4 is a diagram showing a visit history.

FIG. 5 is a diagram showing an example of displaying a list of destination candidates.

FIG. 6 is a diagram showing an example of a screen for notifying that a destination is automatically set.

FIG. 9 is a diagram showing a behavior history regarding web page browsing.

FIG. 10 is a diagram showing a behavior history regarding transmission and reception of e-mail messages.

FIG. 11 is a diagram showing similar behavior dates and times and types of the behavior histories that are extraction sources.

FIG. 12 is a diagram showing a visit history including facility types.

FIG. 13 is a diagram showing an example of distributed points according to the types of the behavior histories.

FIG. 14 is a diagram showing a list of destination candidates.

FIG. 17 is a diagram for describing a generation of a list of facility types from a list of destination candidates.

FIG. 23 is a diagram showing record information of a behavior-location DB.

FIG. 24 is a diagram showing record information of the behavior-location DB.

FIG. 25 is a diagram showing record information of a behavior-type DB.

FIG. 26 is a block diagram showing a configuration of a destination prediction apparatus in a fourth embodiment.

FIG. 27 is a block diagram showing a configuration of a destination prediction apparatus in a fifth embodiment.

DESCRIPTION OF EMBODIMENTS

Figure 7:
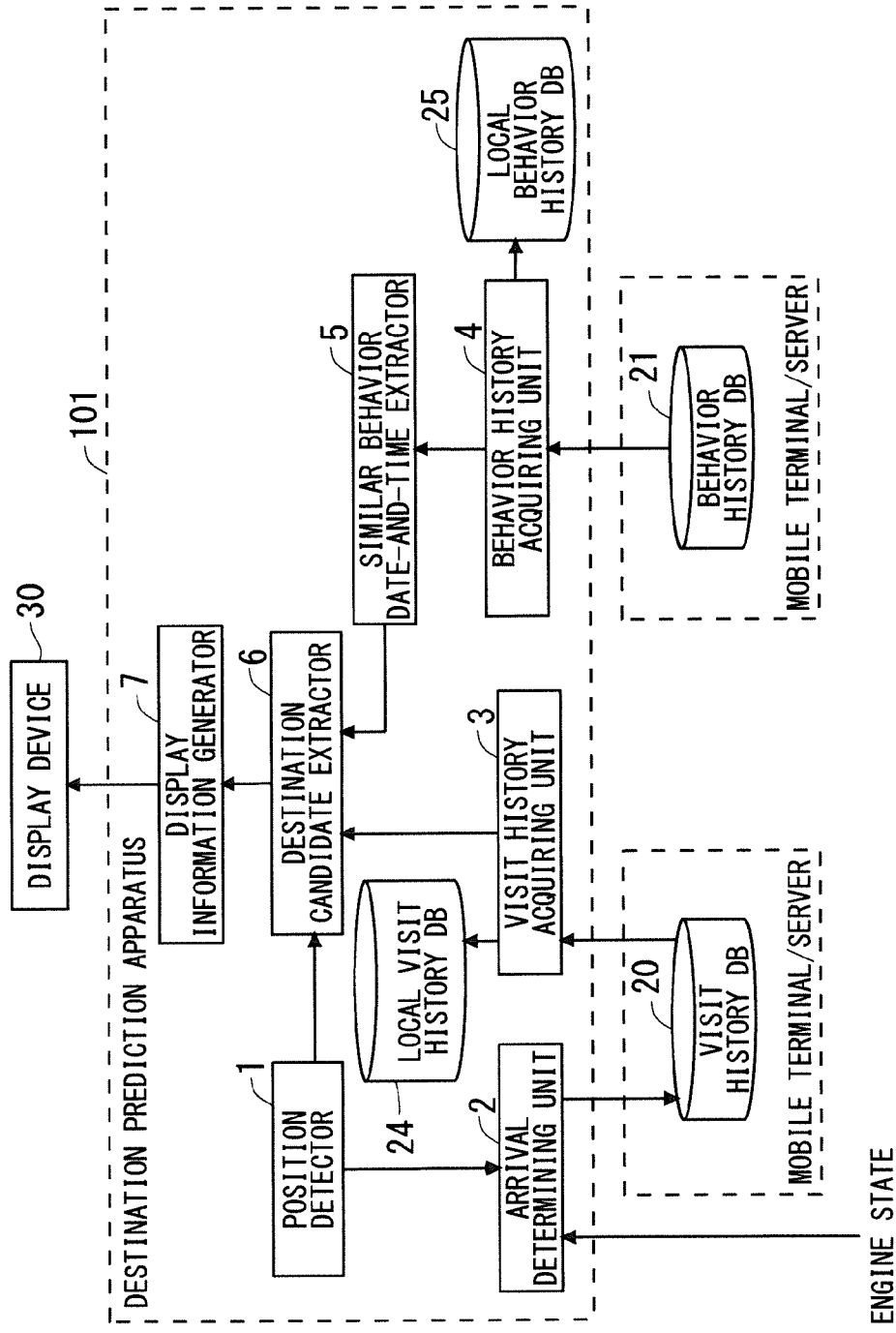
FIG. 7 is a block diagram showing a configuration of a destination prediction apparatus in a modification of the first embodiment.

<A. First Embodiment>
<A-1. Configuration, Operations>

FIG. 1 is a block diagram showing a configuration of a destination prediction apparatus 100 in a first embodiment. The destination prediction apparatus 100 is installed in a mobile body such as a vehicle and predicts a destination of the mobile body. Hereinafter, the destination prediction apparatus 100 is described as a device installed in a vehicle.

The destination prediction apparatus 100 includes a position detector 1, an arrival determining unit 2, a visit history acquiring unit 3, a behavior history acquiring unit 4, a similar behavior date-and-time extractor 5, a destination candidate extractor 6, and a display information generator 7, and the destination prediction apparatus 100 predicts a destination by using a behavior history.

The behavior history is history information that associates a past behavior record and future behavior plans of a user with dates and times. The behavior history is recorded in a behavior history DB 21 included in a mobile terminal, such as a smartphone, a personal digital assistant (PDA), and a tablet, or a server that are capable of communicating with the destination prediction apparatus 100.

FIG. 2 shows a specific example of a behavior history regarding a schedule of a user recorded in the behavior history DB 21. The behavior history includes behavior details, such as "business trip to Company B" and "golf," with the dates and times. For example, a user uses a scheduling application to record his or her own schedule and past behaviors on a smartphone or a server in a connection relationship with a smartphone, thereby generating the behavior history shown in FIG. 2.

The schedule is an example of the behavior history, and the destination prediction apparatus 100 can also use a web page browsing history of a user (FIG. 9) and a history of transmission and reception of e-mail messages (FIG. 10) as the behavior histories. The web page browsing history includes, for example, a uniform resource locator (URL), a title, and a browsing date and time of a web page browsed. The history of transmission and reception of e-mail messages includes, for example, e-mail addresses of a transmitter and a receiver, text, and dates and times of transmission and reception. In addition, a history of keyword search on the Web, a history of incoming and outgoing calls, a life log, a history of social networking service (SNS) transmission, or the like may be treated as the behavior histories.

The visit history is history information that associates locations where a user visited in the past by a vehicle including the destination prediction apparatus 100 installed therein with dates and times. The visit history is recorded in a visit history DB 20 included in a mobile terminal, such as a smartphone, a PDA, and a tablet, or a server that are capable of communicating with the destination prediction apparatus 100. It should be noted that the destination prediction apparatus 100 may include the visit history DB 20.

FIG. 4 is a specific example of the visit history recorded in the visit history DB 20. The visit history includes a departure date and time that indicate a date and time of departure for a visit location, an arrival date and time that indicate a date and time of arrival at the visit location, and information that indicates a latitude and a longitude of the visit location. In addition, the visit history does not necessarily include both of the departure date and time and the arrival date and time and may include any of them.

Next, an inner configuration of the destination prediction apparatus 100 is described. The position detector 1 receives a global positioning system (GPS) signal and acquires a latitude and a longitude of a current location of a vehicle together with time. Then, the acquired information is output as current location information to the arrival determining unit 2 and the destination candidate extractor 6.

The arrival determining unit 2 acquires a vehicle state at regular intervals, for example, and records the visit history in the external visit history DB 20 in a case where the arrival determining unit 2 determines that the vehicle arrives at the destination on the basis of the vehicle state. For example, in a case where an engine is kept OFF and a parking gear or a side break is kept ON for a fixed period of time, it is determined that the vehicle arrives at the destination, and thus the current location information acquired from the position detector 1 together with the date and time are recorded as the visit histories in the visit history DB 20. Alternatively, upon the engine turning ON after the engine has been OFF for more than the fixed period of time, the current location information together with the time period of the engine turned OFF are recorded as the visit histories in the visit history DB 20.

The visit history acquiring unit 3 acquires the visit history from the visit history DB 20 connected to the visit history acquiring unit 3 with wires or without wires and outputs the visit history to the destination candidate extractor 6. A timing of the acquisition is, for example, a timing of an accessory power supply of a vehicle being turned ON or a timing of a user inputting a command for setting a destination. All of the histories recorded in the visit history DB 20 may be acquired, or the history in a preset period may be acquired.

The behavior history acquiring unit 4 acquires the behavior history from the behavior history DB 21 connected to the behavior history acquiring unit 4 with wires or without wires and outputs the behavior history to the similar behavior date-and-time extractor 5. A timing of the acquisition is, for example, a timing of an accessory power supply of a vehicle being turned ON or a timing of a user inputting a command for setting a destination. Here, the behavior history may be acquired by using a function of data backup. For the behavior history DB 21 achieved on a smartphone, the behavior history may be acquired through communication with an application installed in the smartphone. For the behavior history DB 21 achieved on a server, an address and an account setting of the server that have been set beforehand in the destination prediction apparatus 100 are used for connection to the server. All of the histories recorded in the behavior history DB 21 may be acquired, or the history in a preset period may be acquired.

Figure 3:
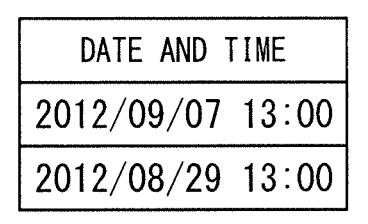

The similar behavior date-and-time extractor 5 acquires the behavior history from the behavior history acquiring unit 4 and then extracts a date and time (similar behavior date and time) that exhibit a behavior similar to the current behavior from the behavior history to output the similar behavior date and time to the destination candidate extractor 6. Here, the current behavior is defined as a behavior within a past predetermined period prior to the present date and time, and the similar behavior date and time are defined as a date and time that exhibit the behavior similar to the current behavior before the past predetermined period prior to the present date and time. In the behavior history in FIG. 2, the present day is assumed to be "2012/09/20" and the day is assumed to be in the past predetermined period prior to the present date and time, whereby the behavior history includes the day with a caption that says "business trip to Company B." The similar behavior date-and-time extractor 5 searches for the date and time with the caption that says "business trip to Company B" in the behavior history before "2012/09/20" and extracts "2012/09/07 13:00" and "2012/08/29 13:00" as the similar behavior dates and times. FIG. 3 shows a data example of the similar behavior dates and times.

In addition, the above-mentioned predetermined period that sets the range for extracting the similar behavior date and time may be different for each type of the behavior history. For the web page browsing history, for example, a date and time in which a page with the same page title and domain as those of the page browsed within 12 hours is browsed are acquired as the similar behavior date and time. For the history of the incoming and outgoing calls, a date and time in which the same phone number as the phone number called within three hours is called are acquired as the similar behavior date and time. For the history of transmission and reception of e-mail messages, a date and time in which an e-mail message with the same e-mail address as that of the e-mail message transmitted and received within 12 hours is transmitted and received are acquired as the similar behavior date and time. For the history of keyword search on the Web, a date and time in which a search is performed by the same keyword as the keyword on the day are acquired as the similar behavior date and time. For the life log, a date and time in which the same log as the log recorded within 12 hours is recorded are acquired as the similar behavior date and time.

A threshold value of an appropriate number of similar behavior dates and times to predict a destination is predetermined, and thus the predetermined period may be reset to be longer to extract the similar behavior date and time again in a case where the number of extractions of the similar behavior date and time is less than the threshold value. For the behavior history that indicates the behavior in a character string, such as the web page browsing history, a morphological analysis is performed on the character string to search for behaviors that are matched in units of words or phrases being a combination of words. The similar behavior date and time may be easily extracted by lowering standards for similarity determination such that the unit of the character string determined to be a match is changed from phrases to words.

Conversely, the predetermined period may be reset to be shorter to extract the similar behavior date and time again in a case where the number of extractions of the similar behavior date and time is more than or equal to the threshold value. For the behavior history that indicates the behavior in the character string, such as the web page browsing history, the similar behavior date and time may be easily extracted by raising standards for similarity determination such that the unit of the character string determined to be a match is changed from words to phrases.

For no behavior history within the past predetermined period prior to the present date and time, a period in which there is no behavior for the predetermined period or more before the past predetermined period is extracted as a similar behavior period, and a freely-selected date and time may be extracted as the similar behavior date and time from the similar behavior period. In the example in FIG. 2, if the present date and time are assumed to be "2012/09/09" and the same day as the present date and time is within the predetermined period, "2012/08/29 13:00-2012/08/31 18:00" and "2012/08/31 18:00-2012/09/03 9:00" that similarly have no behavior history for a day or more are assumed to be the similar behavior periods, and "2012/08/30 15:30" and "2012/09/02 01:30" that are the middle points in each of the time periods, for example, are assumed to be the similar behavior dates and times.

The destination candidate extractor 6 acquires the similar behavior date and time from the similar behavior date-and-time extractor 5 and then extracts a destination candidate on the basis of the similar behavior date and time and the visit history acquired from the visit history acquiring unit 3. Specifically, a visit location whose date and time are closer to the similar behavior date and time is extracted from the visit history. Here, the date and time close to the similar behavior date and time are a date and time within the predetermined period prior to the similar behavior date and time and may be any of a departure time and an arrival time. The predetermined period herein is assumed to be the same period as the predetermined period used in the process of extracting the similar behavior date and time, allowing for an accurate extraction of a destination candidate. The similar behavior date and time are extracted, assuming that the day of the present "2012/09/20" is within the predetermined period in the example in FIG. 2, and thus "2012/09/07" being the day of "2012/09/07 13:00" and "2012/08/29" being the day of "2012/08/29 13:00" are assumed to be within the predetermined period, to thereby extract a location visited within the time period. In the example in FIG. 4, a location 1 (34.000, 135.500) and a location 2 (34.700, 135.678) are each extracted as a destination candidate twice. Here, the destination candidates are extracted in the range of the predetermined period after the similar behavior date and time. However, for the use of the schedule as the behavior history, it is conceivable that the arrival at the visit location is actually late for the scheduled time, and thus the extraction may be performed in the range of the predetermined period prior to the similar behavior date and time.

The destination candidate extractor 6 counts the number of extractions for each destination candidate.

The destination candidate extractor 6 also acquires the current location information of the vehicle from the position detector 1 and thus deletes the current location from the destination candidates. If the current location is, for example, the location 2, the location 2 is deleted from the destination candidates and the destination candidate is only the location 1. Then, the destination candidate is output to the display information generator 7. For the plurality of destination candidates, the destination candidate list information is output to the display information generator 7. In addition, the number of extractions except for the information about the latitude and the longitude may be added to the information about the destination candidates.

The display information generator 7 receives the information about the destination candidates from the destination candidate extractor 6 and generates a display screen of the destination candidates to output the display screen to a display device 30. FIG. 5 shows an example of performing a list display when a destination candidate includes a plurality thereof. A list of the destination candidates that indicates names of places is displayed on the left half of the screen while a map display of the destination candidate selected by a user and a distance from a current location to the destination candidate are displayed on the right half of the screen. The list of the destination candidates may be shown in order of decreasing number of extractions, so that the user easily selects the destination candidate that conceivably has the strongest possibility. The display screen is displayed on the display device 30, and the user looks at the display screen to select any of the destination candidates, whereby the setting of the destination can be easily performed.

In a case where the display information generator 7 acquires a specific destination candidate from the destination candidate extractor 6, the display screen of the destination candidate is generated similarly to the list of the destination candidates and the user looks at the display screen to select the destination candidate, whereby the setting of the destination can be easily performed. Alternatively, the only one destination candidate is set as a destination without waiting for a selection by the user, and a display screen notifying the user that the only one destination candidate has been set as the destination may be generated (FIG. 6). In this case, a cancel button that clears the setting of the destination when the user does not accept the destination is also displayed.

The visit history acquiring unit 3 and the behavior history acquiring unit 4 are achieved by a communication interface that performs communications through 3G lines or the Internet network. The arrival determining unit 2 is achieved by a communication interface that acquires a vehicle state from a vehicle side and a central processing unit (CPU) that runs a program stored in a memory such as a random access memory (RAM). The position detector 1 is achieved as a communication interface that receives GPS signals. The similar behavior date-and-time extractor 5, the destination candidate extractor 6, and the display information generator 7 are achieved by the CPU that runs the program recorded in the memory such as the RAM.

<A-2. Modifications>

As described above, the destination prediction apparatus 100 is assumed to be the device installed in the vehicle, and the visit history DB 20 and the behavior history DB 21 are assumed to be provided on the mobile terminal or the server. However, at least one of the visit history DB 20 and the behavior history DB 21 may be included in the destination prediction apparatus 100. Moreover, the destination prediction apparatus 100 is not necessarily the vehicle-installed device and may be formed on the mobile terminal or the server. For the destination prediction apparatus 100 formed on the server, the vehicle state such as an engine state and the current location information of the vehicle are acquired through communication from the vehicle side. Alternatively, each of the structural components of the destination prediction apparatus 100 may be shared among the vehicle-installed device, the mobile terminal, and the server as appropriate.

Moreover, for the destination prediction apparatus 100 that is the vehicle-installed device and the visit history DB 20 and the behavior history DB 21 that are formed on the mobile terminal or the server, the destination prediction apparatus 100 may further include a local visit history DB 24 and a local behavior history DB 25. FIG. 7 shows a destination prediction apparatus 101 having such configuration. The visit history acquiring unit 3 records, in the local visit history DB 24, a visit history acquired from the visit history DB 20 at every regular interval, for example. The last updated date and time may be recorded in the local visit history DB 24. The behavior history acquiring unit 4 records, in the local behavior history DB 25, a behavior history acquired from the behavior history DB 21 at every regular interval, for example. The last updated date and time may be recorded in the local behavior history DB 25.

Upon connection to the visit history DB 20 and the behavior history DB 21, the destination prediction apparatus 101 records each of the history information in the local visit history DB 24 and the local behavior history DB 25, so that the destination prediction apparatus 101 can predict a destination using the history information when being connected for the last time without being always connected to the network or the mobile terminal.

<A-3. Effects>

The destination prediction apparatus 100 according to the first preferred embodiment includes: the behavior history acquiring unit 4 that acquires, from the behavior history DB 21 in which the behavior history associating the behavior of the user with the date and time is recorded, the behavior history; the visit history acquiring unit 3 that acquires, from the visit history DB 20 in which the visit history associating the visit location of the mobile body with the date and time is recorded, the visit history; the similar behavior date-and-time extractor 5 that performs the similarity determination between the behavior within the predetermined period prior to the present date and time and the behavior in another period with reference to the behavior history and that extracts the date and time of the behavior in another period determined to be similar as the similar behavior date and time from the behavior history; and the destination candidate extractor 6 that extracts, as the destination candidate, the location visited within the predetermined period before or after the similar behavior date and time from the visit history. The visit history DB 20 and the behavior history DB 21 may be formed on the mobile terminal or the server that can be connected to the destination prediction apparatus 100, and at least one of them may be included in the destination prediction apparatus 100. In the configuration described above, the destination candidate can be extracted from the visit history, so that the destination can be easily predicted not by complicated probability calculation.

The behavior history includes at least one of a scheduler, the history of keyword search on the Web, the web page browsing history, the history of incoming and outgoing calls, the history of transmission and reception of e-mail messages, the life log, and the history of SNS transmission. The similar behavior date and time are extracted from such various types of behavior histories, and thus the destination can be easily predicted.

The similar behavior date-and-time extractor 5 performs the similarity determination again by extending the predetermined period for extracting the similar behavior date and time or lowering standards for similarity determination in the case where the number of extractions of the similar behavior date and time is less than the threshold value. Thus, the number of extractions of the similar behavior date and time can be increased.

The similar behavior date-and-time extractor 5 performs the similarity determination again by shortening the predetermined period or raising standards for similarity determination in a case where the number of extractions of the similar behavior date and time is more than or equal to the threshold value. Thus, the number of extractions of the similar behavior date and time can be reduced.

The destination prediction apparatus 100 further includes the display information generator 7 that generates display information for displaying the destination candidate on the display device 30. The destination candidate extractor 6 counts the number of extractions in a case where the same location is extracted as the destination candidate a plurality of times. The display information generator 7 generates the display information in which the plurality of destination candidates are arranged in order of the number of extractions. Therefore, the destination candidate that conceivably has the strongest possibility from the past behavior history can be mainly notified to the user.

The destination prediction apparatus 100 further includes the arrival determining unit 2 (visit history record controller) that records the current location as the visit location in the visit history DB 20 on the basis of at least any states of the engine, the gear, and the side break of the vehicle. The arrival determining unit 2 determines whether the vehicle stops for the fixed period of time on the basis of the states of the engine, the gear, the side break, or the like, and thus the visit history can be recorded upon arrival at the destination.

For no behavior within the predetermined period prior to the present date and time in the behavior history, the similar behavior date-and-time extractor 5 sets, as the similar behavior period, the period in which there is no behavior for the predetermined period or more before the predetermined period prior to the present date and time in the behavior history, and extracts the specific date and time determined in the similar behavior period as the similar behavior date and time. Therefore, even for no behavior in the current behavior history, the similar behavior date and time characterized in "without behaviors" can be extracted, and a location related to "without behaviors" can be predicted as a destination.

For the behavior history that indicates each behavior in the character string, the similar behavior date-and-time extractor 5 performs the morphological analysis on the character string to perform the similarity determination from the words or the combination of words. Thus, the similar behavior date and time can be extracted.

The destination prediction apparatus 101 of the modification according to the first embodiment includes the local visit history DB 24 that records the visit history acquired by the visit history acquiring unit 3 and includes the local behavior history DB 25 that records the behavior history acquired by the behavior history acquiring unit 4, so that the destination prediction apparatus 101 can predict a destination using the history information acquired when being connected thereto in the past instead of being always connected to the network of the server or connected to the mobile terminal.

The destination prediction method according to the first preferred embodiment includes the steps of: (a) extracting, from the behavior history that associates the behavior of the user with the date and time, the similar behavior date and time that exhibit the behavior similar to the behavior within the predetermined period prior to the present date and time; and (b) extracting, as the destination candidate from the visit history that associates the visit location of the mobile body with the date and time, the location visited within the predetermined period before or after the similar behavior date and time. Therefore, the destination candidate can be easily extracted not by complicated probability calculation.

The destination display method of the first preferred embodiment for predicting the destination of the mobile body and displaying the destination on the display unit includes the step of (a) displaying, on the display unit, the destination candidate extracted as the location visited within the predetermined period before or after the similar behavior date and time from the visit history, the similar behavior date and time exhibiting the behavior similar to the behavior within the predetermined period prior to the present date and time. The behavior of an individual associated with the date and time is recorded in the behavior history. The visit location associated with the date and time is recorded in the visit history. Therefore, the destination candidate is easily extracted not by complicated probability calculation and is displayed, allowing for the user to easily perform the setting of the destination.

<B. Second Embodiment>
<B-1. Configuration, Operations>

Figure 8:
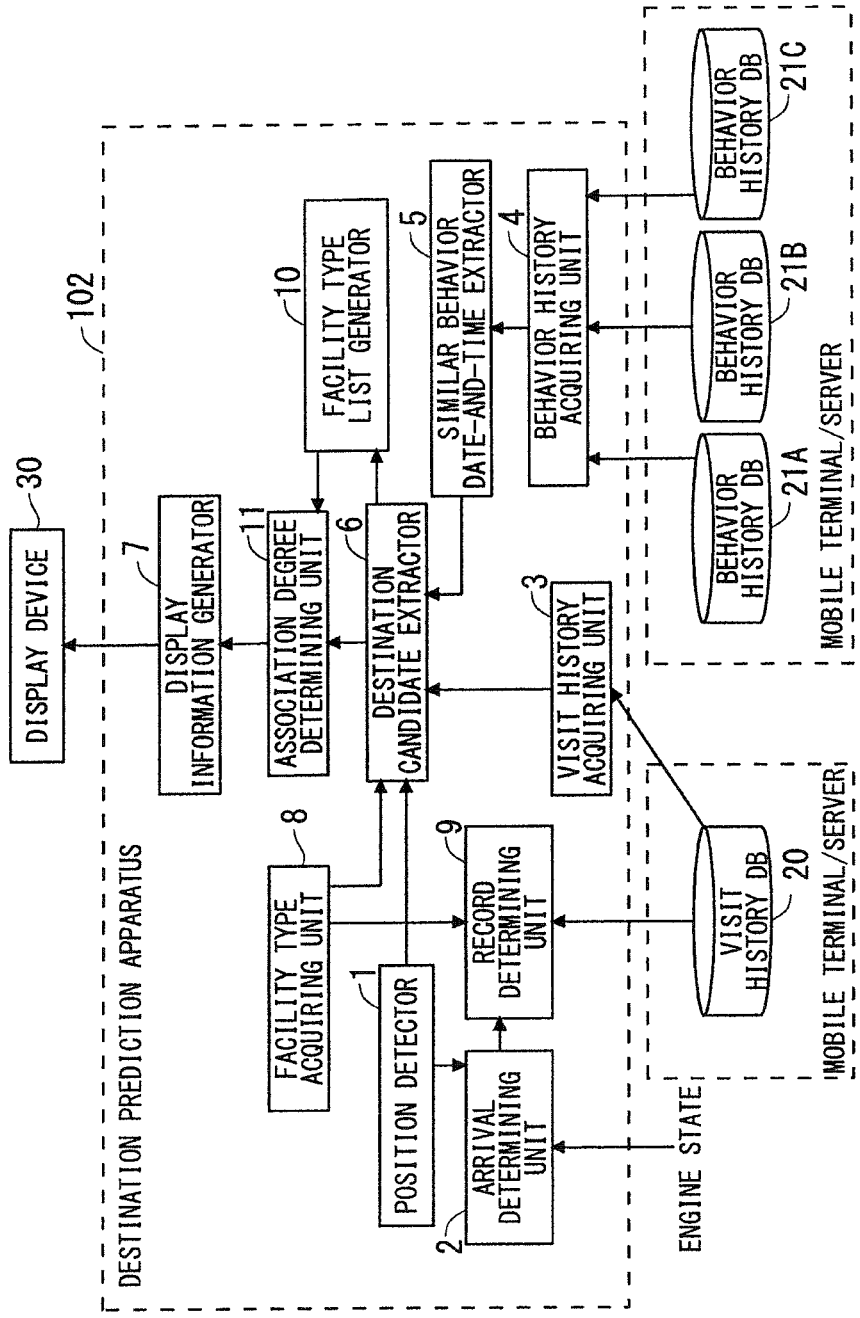
FIG. 8 is a block diagram showing a configuration of a destination prediction apparatus in a second embodiment.

FIG. 8 is a block diagram showing a configuration of a destination prediction apparatus 102 according to a second embodiment. The destination prediction apparatus 102 is different from the destination prediction apparatus 100 according to the first embodiment in that the destination prediction apparatus 102 extracts destination candidates using a plurality of types of behavior histories DBs 21A, 21B, 21C. The destination prediction apparatus 102 further includes a facility type acquiring unit 8, a record determining unit 9, and a facility type list generator 10 in addition to the configuration of the destination prediction apparatus 100. Hereinafter, it is described that the destination prediction apparatus 102 is assumed to be installed in a vehicle and that the behavior histories DBs 21A, 21B, 21C and the visit history DB 20 are formed on the mobile terminal or the server, but the destination prediction apparatus 102 may include at least one of the behavior histories DBs 21A, 21B, 21C and the visit history DB 20 similarly to the first embodiment. In FIG. 8, structural components corresponding to those of the destination prediction apparatus 100 in the first embodiment have the same reference numerals, and differences between the first embodiment and the second embodiment are only described below.

The behavior histories DBs 21A, 21B, 21C are different types of behavior histories, such as a scheduler, a web page browsing history, a history of keyword search on the Web, a history of incoming and outgoing calls, a life log, and a history of SNS transmission, or behavior histories of different users, such as a driver and a passenger.

FIG. 12 shows a specific example of a visit history recorded in the visit history DB 20. The visit history includes a departure date and time that indicate a date and time of departure for a visit location, an arrival date and time that indicate a date and time of arrival at the visit location, information that indicates a latitude and a longitude of the visit location, and facility types at the visit location. In addition, the visit history does not necessarily include both of the departure date and time and the arrival date and time and may include any of them.

The behavior history acquiring unit 4 acquires the behavior histories together with the types thereof from the behavior histories DBs 21A, 21B, 21C.

The similar behavior date-and-time extractor 5 extracts similar behavior dates and times from the behavior histories acquired by the behavior history acquiring unit 4 and also extracts the types of the behavior histories that are sources from which the similar behavior dates and times are extracted. FIG. 11 shows an example of data of the similar behavior dates and times extracted in a case where the schedule (FIG. 2), the web page browsing history (FIG. 9), and the history of the transmission and reception of the e-mail messages (FIG. 10) are used as the behavior histories. A method of extracting the similar behavior dates and times is similar to that in the first embodiment. In FIG. 11, the type of the similar behavior dates and times shown in FIG. 3 is extracted as the "schedule." In addition, "2012/09/07 11:00" and "2012/09/07 09:00" on which the "bbb traffic information" and the "schedule" have respectively been browsed are extracted from the web page browsing history, the "bbb traffic information" and the "schedule" having been browsed on the day of September $20^{th}$. Moreover, "2012/08/29 12:00" is extracted from the history of the transmission and reception of the e-mail messages, "2012/08/29 12:00" being a date and time in which an e-mail message is sent to the same transmission destination as that to which the e-mail message is sent on the day of September $20^{th}$.

The facility type acquiring unit 8 acquires the current location information from the position detector 1, acquires a facility type of the current location with reference to map data, and outputs the facility type to the record determining unit 9.

The record determining unit 9 determines whether the visit history of the current location is recorded in the visit history DB 20 on the basis of the facility type of the current location acquired from the facility type acquiring unit 8 when the arrival determining unit 2 determines the arrival at a destination. For example, in a case where a location type of the current location is a gas station or a service area of a highway, it is determined that the record is not needed. When it is determined that the record is needed, a departure date and time, an arrival date and time, a latitude, a longitude, a facility type are recorded as the visit histories in the visit history DB 20. The record determining unit 9 and also the arrival determining unit 2 operate as visit history record controllers that control records in the visit history DB 20.

The destination candidate extractor 6 acquires the similar behavior dates and times from the similar behavior date-and-time extractor 5 and then extracts destination candidates on the basis of the similar behavior dates and times and the visit history acquired from the visit history acquiring unit 3. A method of extracting destination candidates is similar to that in the first embodiment. The time periods for extracting the destination candidates from the schedule, the web page browsing history, and the history of the transmission and reception of the e-mail messages are set as the day, 12 hours, and 12 hours, respectively. In examples of FIGS. 11 and 12, a location 1 (34.000, 135.500) and a location 2 (34.700, 135.678) are each extracted twice from the schedule, the location 1 (34.000, 135.500) and the location 2 (34.700, 135.678) are each extracted twice from the web page browsing history, and the location 1 (34.000, 135.500) and the location 2 (34.700, 135.678) are each extracted once from the history of the transmission and reception of the e-mail messages.

Points are distributed to the behavior histories according to the types in advance. FIG. 13 is an example of distributed points to the behavior histories, indicating that destination candidates extracted from the behavior histories with the higher distributed points have the higher reliability. The distributed points may also be set freely by a user.

The destination candidate extractor 6 counts the number of extractions of the destination candidates, divides the points distributed to each type of the behavior history according to the number of similar behavior dates and times extracted from the behavior history, and further divides the points according to the number of locations extracted from the similar behavior dates and times.

In the examples of FIGS. 11 to 13, 50 points distributed to the schedule are divided into 25 points for each of the dates and times that are "2012/09/07 13:00" and "2012/08/29 13:00" extracted from the schedule. Next, 25 points distributed to the dates and times are divided into 12.5 points each for the location 1 (34.000, 135.500) and the location 2 (34.700, 135.678) extracted from "2012/09/07 13:00." Next, 25 points distributed to the dates and times are divided into 12.5 points each for the location 1 (34.000, 135.500) and the location 2 (34.700, 135.678) extracted from "2012/08/29 13:00." Thus, a total of the distributed points of the locations 1 on all of the dates and times extracted from the schedule and a total of the distributed points of the locations 2 on all of the dates and times from the schedule are each 25 points.

The process as described above is also performed on the web page browsing history, and then the distributed points of the locations 1, 2 are each 12.5 points. The process is also performed on the history of the transmission and reception of the e-mail messages, and then the distributed points of the locations 1, 2 are each 12.5 points. Therefore, 50 points of the total distributed points in all of the behavior histories are allotted to the location 1, and 50 points are similarly allotted to the location 2. Thus, the points allotted to the destination candidates indicate the percentage of the number of extractions in the total number of extractions of all destination candidates. As the points are higher, the number of extractions of the destination candidate accounts for the higher percentage of the number of extractions as a whole, whereby it can be said that a degree of association with the current behavior is high.

FIG. 14 shows a list of destination candidates including the number of extractions and points for each destination candidate. In addition, the destination candidate extractor 6 acquires the current location information from the position detector 1, so that if the location 2 (34.700, 135.678) is the same location as the current location, only the location 1 is the destination candidate. The destination candidate extractor 6 outputs the number of extractions and the points of the destination candidate to an association degree determining unit 11.

Figure 15:
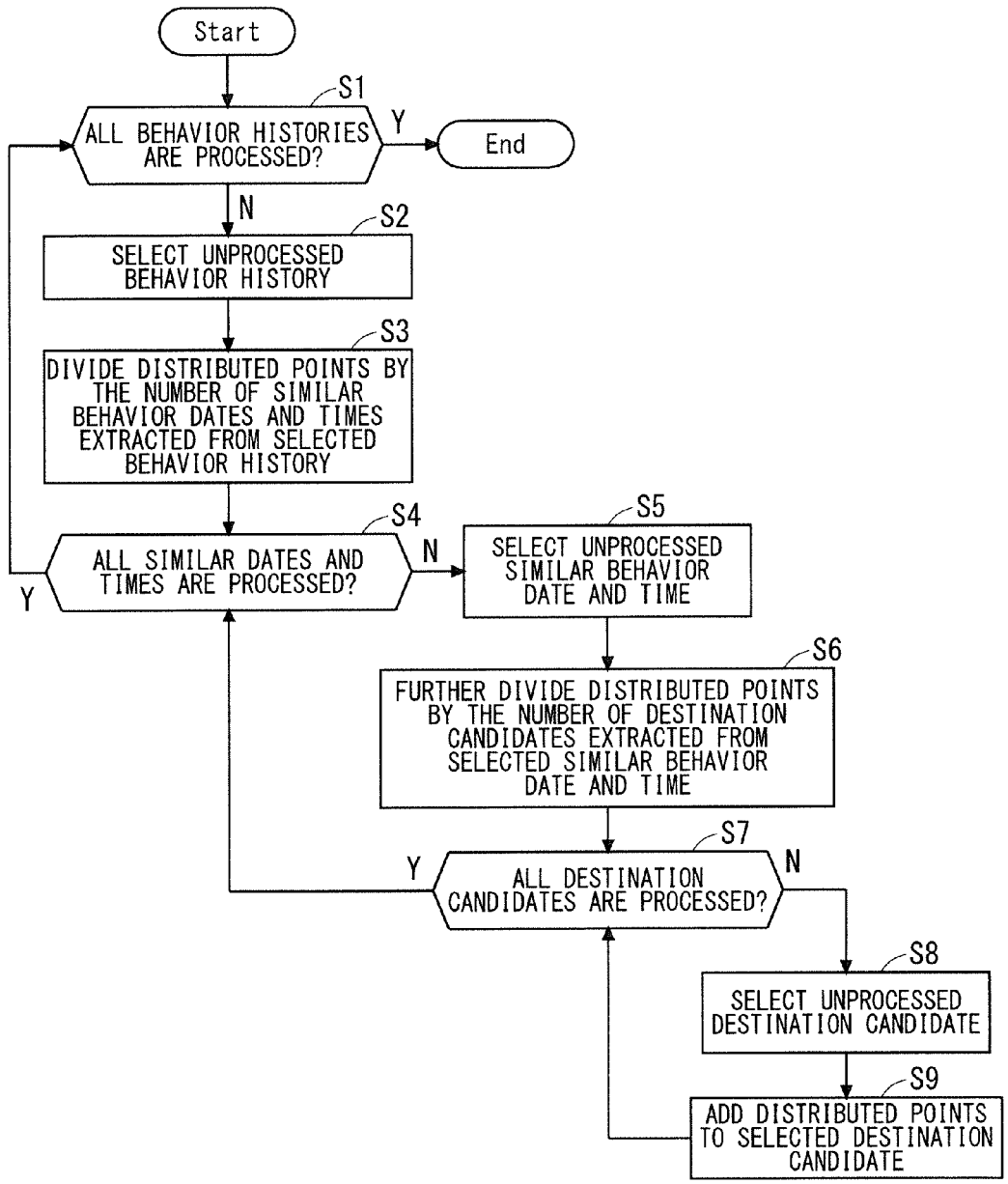
FIG. 15 is a flow chart showing a process of distributing points of a destination candidate extractor.

FIG. 15 is a flow chart showing a process of distributing points of the destination candidate extractor 6. First, it is determined whether all types of behavior histories are processed (step S1), and if the process is not completed, the unprocessed behavior history is selected (step S2). Next, distributed points allocated to the behavior history are divided by the number of similar behavior dates and times extracted from the selected behavior history (step S3). Then, it is determined whether all of the similar behavior dates and times extracted from the selected behavior history are processed (step S4), and if the process is not completed, the unprocessed similar behavior date and time are selected (step S5). Next, the distributed points allotted to the selected similar behavior date and time are divided by the number of destination candidates extracted from the selected similar behavior date and time (step S6). After that, it is determined whether all of the destination candidates extracted from the selected similar behavior date and time are processed (step S7), and if the process is not completed, the unprocessed destination candidate is selected (step S8). Next, the distributed points determined in step S6 are added to the distributed points of the selected destination candidate (step S9). All of the locations are checked in step S7, thereby returning to step S4. All of the similar behavior dates and times extracted from the behavior history during the process are checked in step S4, thereby returning to step S1. All types of the behavior histories are checked in step S1, thereby completing the process.

Next, the association degree determining unit 11 is described. The association degree determining unit 11 determines a degree of association between the current behavior and the destination candidate on the basis of the points of the destination candidate extracted by the destination candidate extractor 6 to predict the destination candidate having the high degree of association as the destination. In a case where the destination candidate having the high degree of association is not found, a list of facility types of destination candidates is acquired from the facility type list generator 10 to perform a setting of a destination by the types.

In the case where the destination candidate having the high degree of association is not found by the association degree determining unit 11, the facility type list generator 10 acquires a list of the destination candidates from the association degree determining unit 11 to generate the list of the facility types on the basis of the list of the destination candidates, and outputs the list of the facility types to the association degree determining unit 11. The list of the facility types is generated by replacing the latitude and the longitude information of the destination candidates on the list of the destination candidates (part (a) of FIG. 17) with the facility type (part (b) of FIG. 17) and then adding the number of extractions and the points in the same facility type to combine them into one (part (c) of FIG. 17). The facility types can be acquired from the map data, for example.

Figure 16:
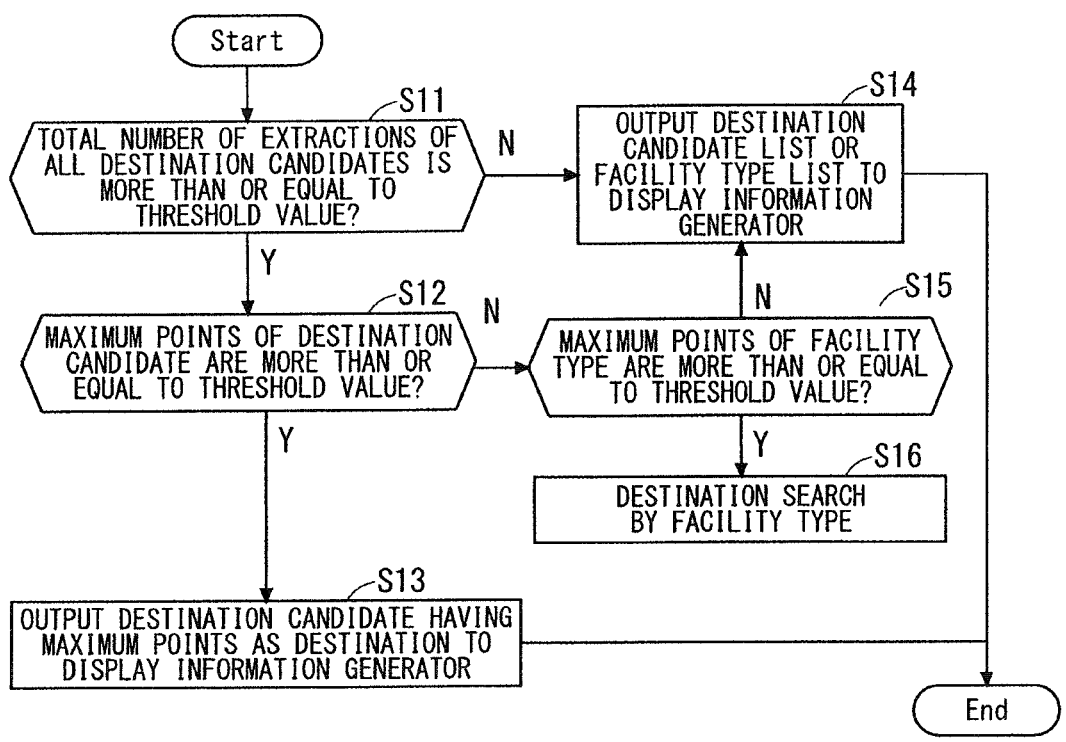
FIG. 16 is a flow chart showing an operation of an association degree determining unit.

FIG. 16 is a flow chart showing an operation of the association degree determining unit 11. First, the association degree determining unit 11 determines whether the total number of extractions of all the destination candidates is more than or equal to a predetermined threshold value (step S11). If the total number of extractions is more than or equal to the threshold value, it is determined whether the maximum points of the destination candidate are more than or equal to the predetermined threshold value (step S12). If the maximum points are more than or equal to the threshold value, it is determined that the destination candidate has the high degree of association with the current behavior, outputting the destination candidate predicted as the destination to the display information generator 7 (step S13).

In a case where the total number of extractions of all the destination candidates is less than the threshold value in step S11, a specific destination candidate cannot be decided due to insufficient data collected and thus low accuracy of extracting the destination candidates, and the list of the destination candidates is output to the display information generator 7 (step S14) to complete the process. In other words, all of the destination candidates on the list of the destination candidates are predicted as destinations. It should be noted that in a case where there is only one destination candidate, the destination candidate is output to the display information generator 7.

For the maximum points of the destination candidate less than the threshold value in step S12, it is determined whether the maximum points of the facility type are more than or equal to the threshold value with reference to the list of the facility types acquired from the facility type list generator 10 (step S15). If the maximum points of the facility type are more than or equal to the threshold value, the facility type is predicted as the facility type of the destination. Then, a destination search by the facility types is performed, and the search result is output to the display information generator 7 (step S16). If the maximum points of the facility type are less than the threshold value, the list of the facility types is output to the display information generator 7 (step S14). In other words, all of the facility types on the list of the facility types are predicted as facility types of destinations.

Figure 18:
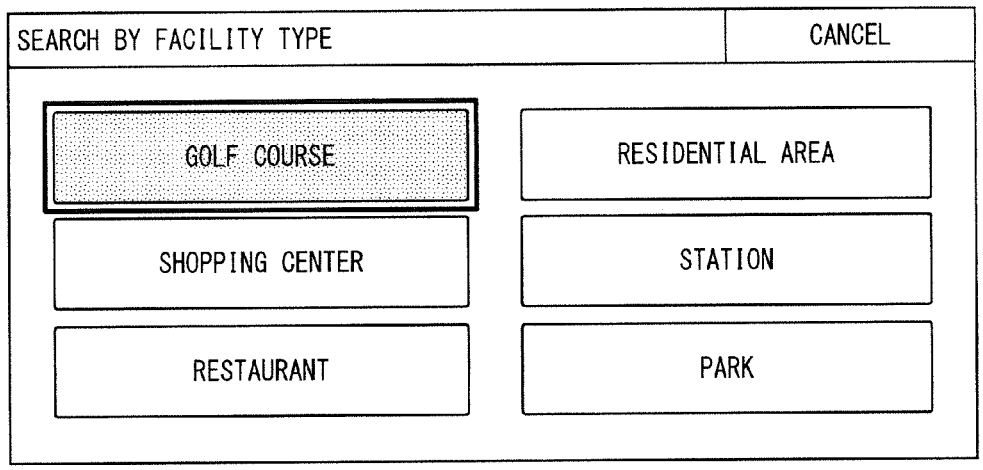
FIG. 18 is a diagram showing a display screen of a search by facility types.

The display information generator 7 generates a display screen of the display device 30 on the basis of the information acquired from the association degree determining unit 11 and outputs the display screen to the display device 30. In the case where the association degree determining unit 7 acquires the list of the destination candidates, the display screen of the destination candidates as shown in FIG. 5 is generated. A user who looks at this screen selects the destination candidate on the list to set the destination. Here, a display screen in which the list of the destination candidates is arranged in order of the number of extractions or the points may be generated. Thus, the user can easily select the destination candidate that is more likely to be a destination. Also in the case where the list of the facility types is acquired from the association degree determining unit 11, a display screen for performing the search by the facility types as shown in FIG. 18 is generated. A user who looks at this screen selects a golf course, and thus the destination can be set by the destination search by the type "golf course."

Also in a case where the display information generator 7 acquires a specific destination candidate from the association degree determining unit 11, a display screen of the destination candidate is generated similarly to the list of the destination candidates and the user looks at the display screen to select the destination candidate, whereby the setting of the destination can be easily performed. Alternatively, the only one destination candidate is set as a destination without waiting for a selection by the user, and the display screen notifying the user that the only one destination candidate has been set as the destination may be generated (FIG. 6). In this case, a cancel button that clears the setting of the destination when the user does not accept the destination is also displayed. After the setting of the destination, a route guidance from the current location to the destination, an expected arrival time at the destination, congestion information on a route, or the like may be displayed.

Figure 19:
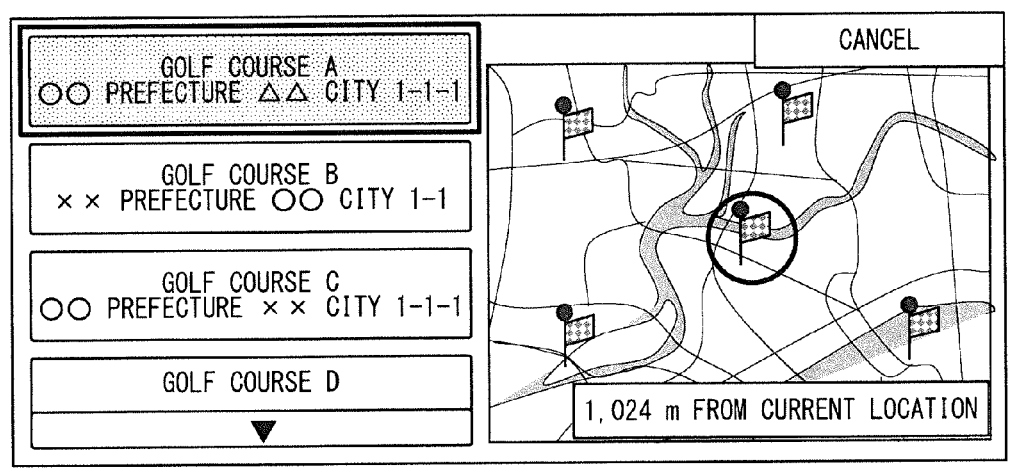
FIG. 19 is an example of a display screen of a destination search result by the facility types.

Also in a case where the display information generator 7 acquires a specific facility type from the association degree determining unit 11, the destination search is performed by the facility types, and a display screen of the search result is generated. FIG. 19 is an example of a display screen including a golf course specified as the facility type. The user looks at the display screen to select any of the golf courses, whereby the setting of the destination can be easily performed. In the destination search by the facility types, a destination candidate of the same type as a specific facility type (golf course) may be extracted from the list of the destination candidates generated by the destination candidate extractor 6. Additionally, an area of the destination search by the facility types may be limited by using position information of the destination candidate belonging to the specific facility type (golf course) on the list of the destination candidates. If all destination candidates of the type being the golf course, for example, on the list of the destination candidates are golf courses in A prefecture, the golf courses in A prefecture are searched, and the search result is displayed on the display device 30.

In addition, the modification of the first embodiment may be applied to the second embodiment.

<B-2. Effects>

The destination prediction apparatus 102 according to the second preferred embodiment includes the association degree determining unit 11 (destination-or-the-like predicting unit) that predicts the destination or its type from the destination candidate extracted by the destination candidate extractor 6 and includes the display information generator 7 that generates the display information for notifying the user of the destination or the type predicted by the association degree determining unit 11. The destination candidate extractor 6 counts the number of extractions in the case where the same location is extracted as the destination candidate a plurality of times, and the association degree determining unit 11 predicts the destination candidate as the destination when the total number of extractions of all of the destination candidates is more than or equal to a first threshold value and the percentage of the number of extractions in the total number of extractions of all of the destination candidates is more than or equal to the second threshold value. Thus, in the case where there is the destination candidate that is highly associated with the current behavior, the destination candidate is predicted as the destination.

In the destination prediction apparatus 102 according to the second preferred embodiment, the destination candidate extractor 6 counts the number of extractions in the case where the same location is extracted as the destination candidate a plurality of times, and the association degree determining unit 11 (destination-or-the-like predicting unit) predicts all of the destination candidates as the destinations in the case where the total number of extractions of all of the destination candidates is less than the first threshold value. In a low total number of extractions, the accuracy of extracting the destination candidates is low and the prediction result cannot be narrowed to any of the destination candidates, so that all of the destination candidates are predicted as destinations. For example, all of the destination candidates are displayed on a list for a selection by the user, and thus the user can easily set the destination.

The destination prediction apparatus 102 according to the second preferred embodiment further includes the facility type acquiring unit 8 that acquires the facility type of the destination candidate and the facility type list generator 10 (number-of-extractions-for-every-type calculator) that calculates the number of extractions of the destination candidate for each facility type. The destination candidate extractor 6 counts the number of extractions in the case where the same location is extracted as the destination candidate, and the association degree determining unit 11 (destination-or-the-like predicting unit) acquires the facility type of each of the destination candidates from the facility type acquiring unit 8 in the case where the number of extractions is more than or equal to the first threshold value and the percentage of the number of extractions of any of the destination candidates in the total number of extractions of all of the destination candidates is less than the second threshold value, and predicts the facility type as the facility type of the destination when the number of extractions for each facility type is more than or equal to the threshold value. Thus, in a case where any of the destination candidates extracted by the destination candidate extractor 6 is not highly associated with the current behavior, a destination is predicted on the basis of the facility type of the destination candidate that is highly associated with the current behavior. In this case, the display information generator 7 generates the display information that indicates the search result of the destination by the facility type predicted by the association degree determining unit 11, so that the user can easily set the destination from the search result. Furthermore, the area of the search may be narrowed by using the position information of the destination candidate belonging to the facility type predicted by the association degree determining unit 11, thereby improving the accuracy of searching.

In the destination prediction apparatus 102 according to the second preferred embodiment, the association degree determining unit 11 (destination-or-the-like predicting unit) acquires the facility type of each of the destination candidates from the facility type acquiring unit 8 in the case where the number of extractions is more than or equal to the first threshold value and the percentage of the number of extractions of any of the destination candidates in the total number of extractions of all of the destination candidates is less than the second threshold value, and predicts all of the facility types as the facility types of the destinations when the number of extractions for each facility type is less than the threshold value. In this case, the display information generator 7 generates, as the display information, the list display screen of the facility types arranged in order of the number of extractions for each facility type, so that the destination search by the facility type that is selected by the user from the list display screen can easily set the destination.

In the destination prediction apparatus 102 according to the second preferred embodiment, the record determining unit 9 (visit history record controller) determines whether the record in the visit history DB 20 is needed on the basis of the facility type of the current location and can thus determine that the record in the visit history DB is not needed in the case where the location type of the current location is, for example, a gas station or a service area of a highway. In the case where the current location is the visit location, the record determining unit 9 (visit history record controller) may also record the facility type of the current location.

The destination prediction method according to the second preferred embodiment includes the step of (c) setting the destination from the destination candidate. The step (c) includes the steps of (c1) acquiring the facility type of the destination candidate and (c2) setting the destination in the destination search by using the facility type. Therefore, the destination candidate can be easily extracted not by complicated probability calculation.

<C. Third Embodiment>
<C-1. Configuration, Operations>

Figure 20:
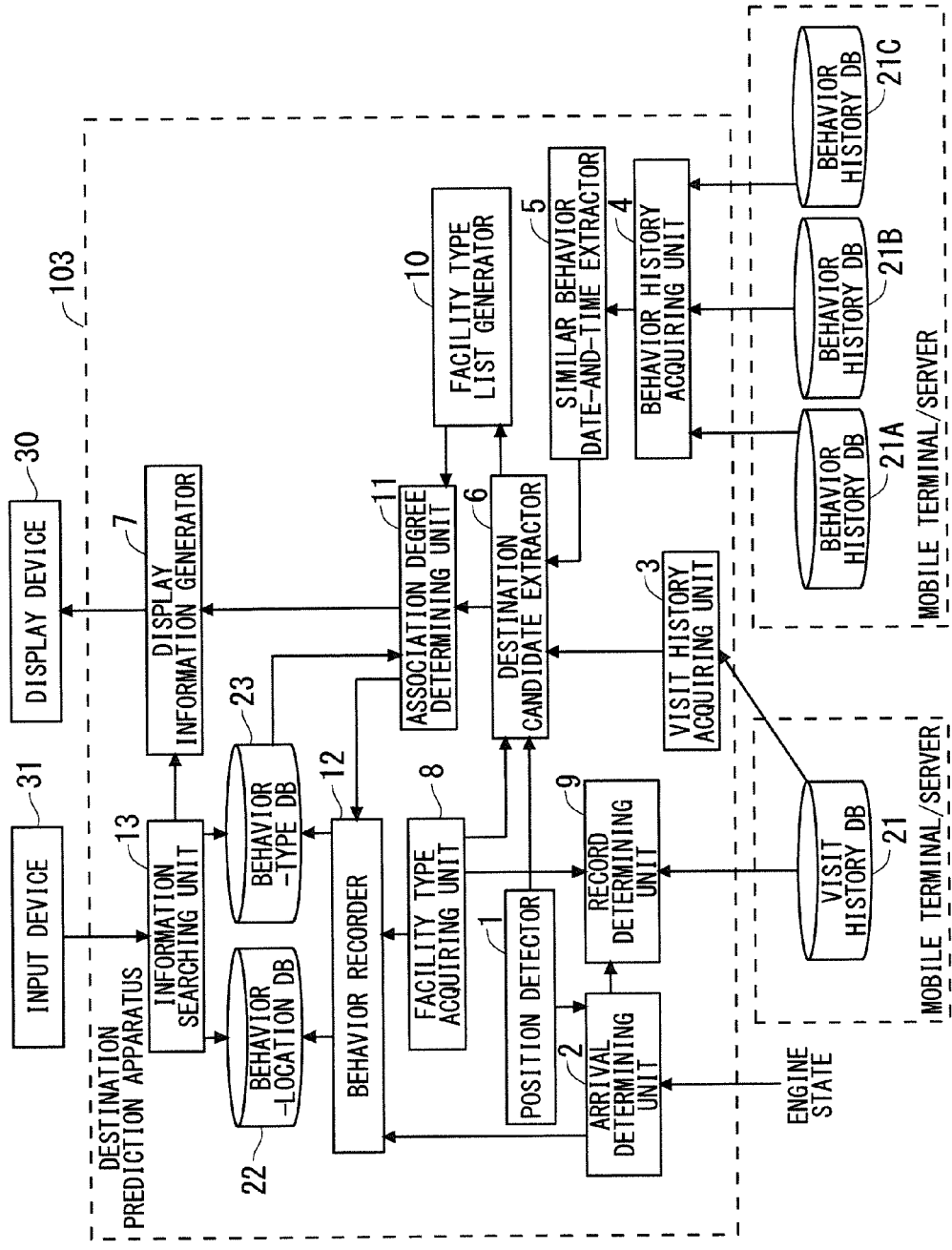
FIG. 20 is a block diagram showing a configuration of a destination prediction apparatus in a third embodiment.

FIG. 20 is a block diagram showing a configuration of a destination prediction apparatus 103 in a third embodiment. In FIG. 20, the same structural components as or structural components corresponding to those of the destination prediction apparatus 102 shown in FIG. 8 have the same reference numerals. The destination prediction apparatus 103 further includes a behavior recorder 12, an information searching unit 13, a behavior-location DB 22, and a behavior-type DB 23 in addition to the configuration of the destination prediction apparatus 102 in the second embodiment. Hereinafter, differences between the destination prediction apparatus 102 and the destination prediction apparatus 103 are only described.

When the arrival determining unit 2 determines an arrival at a destination, the arrival determining unit 2 outputs that and position information of a current location to the behavior recorder 12. The behavior recorder 12 receives those and then checks whether the current location matches the destination candidate extracted by the destination candidate extractor 6.

Figure 21:
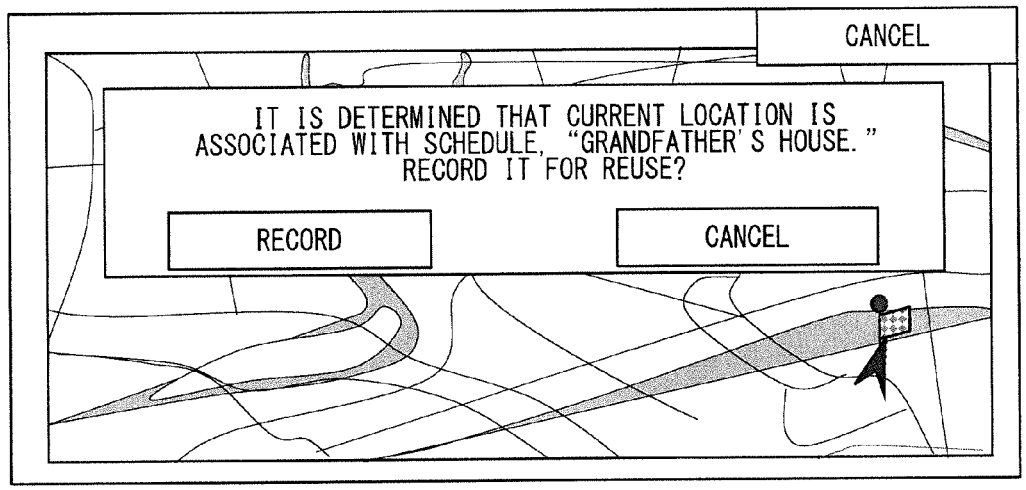
FIG. 21 is a diagram showing a screen that checks whether to associate a behavior with a location for a record.

When the current location matches the destination candidate, it is determined that the association is proved between the destination candidate and the behavior history being the source from which the destination candidate is extracted, and thus a message that checks with the user whether to record the association in the behavior-location DB 22 for reuse is displayed on the display device 30 (FIG. 21).

When the user selects the recording, the behavior recorder 12 associates the position information of the destination candidate with the behavior history determined to be associated with each other for a record in the behavior-location DB 22. FIG. 23 shows an example of record information of the behavior-location DB 22 regarding a schedule, and FIG. 24 shows an example of record information of the behavior-location DB 22 regarding a web page browsing history.

Alternatively, in a case where the destination candidate having the high degree of association is not found in the association degree determining unit 11 and the setting of the destination by the facility types is thus performed, the behavior recorder 12 acquires the type of the current location from the facility type acquiring unit 8 and determines whether the type of the current location matches the facility type of the setting of the destination.

Figure 22:
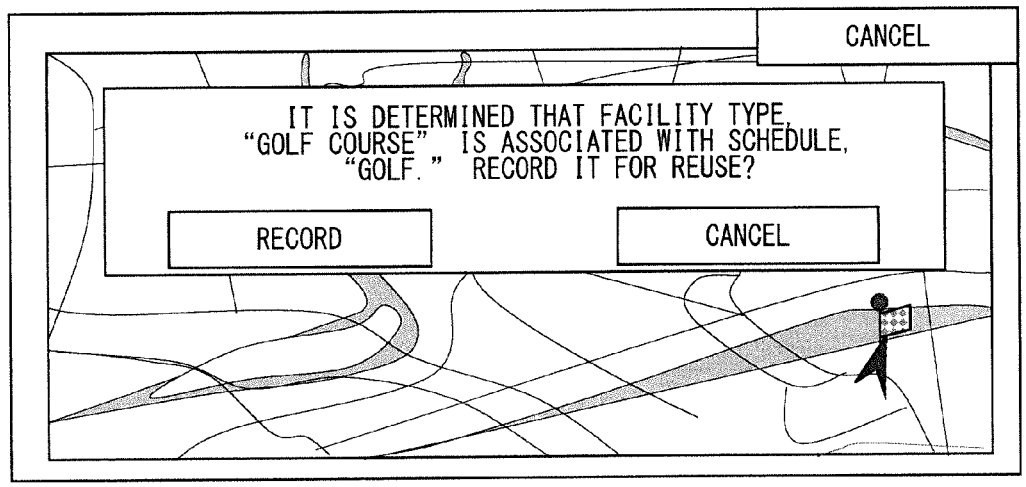
FIG. 22 is a diagram showing a screen that checks whether to associate a behavior with a type for a record.

When the type of the current location matches the facility type, it is determined that the association is proved between the facility type matching the type of the current location and the behavior history being the source from which the facility type is extracted, and thus a message that checks with the user whether to record the association in the behavior-type DB 23 for reuse is displayed on the display device 30 (FIG. 22).

When the user selects the recording, the behavior recorder 12 associates the facility type with the behavior history determined to be associated with each other for a record in the behavior-type DB 23. FIG. 25 shows an example of the behavior-type DB 23 regarding the schedule.

The association degree determining unit 11 has a function of searching the behavior-location DB 22 and the behavior-type DB 23 in addition to the function of the second embodiment. In other words, in a case where the total number of extractions of all the destination candidates is less than the threshold value or a case where the total number of extractions is more than or equal to the threshold value and also the maximum points of the destination candidate are more than or equal to the threshold value, a location associated with the current behavior is searched in the behavior-location DB 22. Here, the current behavior is a behavior recorded in a past predetermined period prior to the present date and time in the behavior history. If the associated location is found in the behavior-location DB 22, the destination candidate extracted by the destination candidate extractor 6 is replaced with the location to be the destination candidate. For the plurality of associated locations found in the behavior-location DB 22, the display information generator 7 generates a list display of these locations, and the list is displayed on the display device 30.

Moreover, in a case where the total number of extractions of all the destination candidates is more than or equal to the threshold value and also the maximum point of the destination candidate are less than the threshold value, a type associated with the current behavior is searched in the behavior-type DB 21 similarly to the search in the behavior-location DB 22. If the associated facility type is found in the behavior-type DB 23, the facility type is adopted instead of the facility type of the destination candidate extracted by the destination candidate extractor 6. The display information generator 7 displays the destination search result by the adopted facility type to provide it to the destination selection for the user. For the plurality of associated facility types found in the behavior-type DB 23, the display information generator 7 generates a selection screen of the plurality of facility types and displays the destination search result by the facility types selected by the user to provide it to the destination selection for the user.

When the user inputs behavior details from an input device 31, the information searching unit 13 acquires the input to search the behavior-location DB 22. The input device 31 is a keyboard or an audio input interface. For example, when the user speaks or inputs characters of "grandfather's house," the behavior-location DB 22 is searched and a location associated with the grandfather's house is acquired. If the location associated with the grandfather's house is found, the display information generator 7 generates a display screen that sets the location as the destination and displays it on the display device 30 for the user.

Similarly, the information searching unit 13 may search the behavior-type DB 23 to acquire a facility type associated with the behavior details input by the user. In this case, the display information generator 7 generates the destination search result by the facility types as display information.

In addition, the modification of the first embodiment may also be applied to the third embodiment.

<C-2. Effects>

The destination prediction apparatus 103 according to the third preferred embodiment includes the behavior-location DB 22 that associates the behavior details of the behavior history with the destination candidate when the mobile body arrives at the destination candidate extracted by the destination candidate extractor 6, the behavior history being the source from which the destination candidate is extracted. In the case where the past predetermined period prior to the present date and time includes the same behavior details recorded in the behavior history as the behavior details entered in the behavior-location DB, the association degree determining unit 11 (destination-or-the-like predicting unit) predicts, as the destination, the location associated with the behavior details in the behavior-location DB. Thus, the destination candidate that had been proved in the past to be associated with the behavior details is predicted as the destination, so that the accuracy of predicting a destination can improve.

The destination prediction apparatus 103 according to the third preferred embodiment further includes the facility type acquiring unit 8 that acquires the facility type of the destination candidate and includes the behavior-type DB 23 in which the behavior details of the behavior history and the facility type are entered when the mobile body arrives at the location belonging to the facility type of the destination candidate acquired by the facility type acquiring unit 8, the behavior history being the source from which the destination candidate is extracted. In the case where the past predetermined period prior to the present date and time includes the same behavior details recorded in the behavior history as the behavior details entered in the behavior-type DB 23, the association degree determining unit 11 (destination-or-the-like predicting unit) predicts, as the facility type of the destination, the facility type associated with the behavior details in the behavior-type DB 23. Thus, the facility type of the destination candidate that had been proved in the past to be associated with the behavior details is predicted as the facility type of the destination, so that the accuracy of predicting a facility type can improve.

<D. Fourth Embodiment>

<D-1. Configuration, Operations>

FIG. 26 is a block diagram showing a configuration of a destination prediction apparatus 104 in a fourth embodiment. In FIG. 26, the same structural components as or structural components corresponding to those of the destination prediction apparatus 100 in the first embodiment shown in FIG. 1 have the same reference numerals. The destination prediction apparatus 104 includes a characteristic behavior extractor 14 in addition to the configuration of the destination prediction apparatus 100. The configuration except for the characteristic behavior extractor 14 is the same as that of the destination prediction apparatus 100, so that descriptions will be omitted.

The characteristic behavior extractor 14 acquires a behavior history from the behavior history acquiring unit 4 and extracts a characteristic behavior from each behavior recorded in the behavior history. The similar behavior date-and-time extractor 5 acquires the behavior history regarding the characteristic behavior from the characteristic behavior extractor 14 and extracts, as the similar behavior date and time, a date and time in which the characteristic behavior similar to the current (within a past predetermined period prior to the present date and time) characteristic behavior in the behavior history is exhibited.

Here, the characteristic behavior represents a behavior except for behaviors exhibited in everyday lives. For example, going to work as the behavior history is a daily activity on weekdays, so that it is not worth extracting the similar behavior date and time from this. The similar behavior date and time are extracted from the characteristic behavior except for such general behavior, so that the accuracy of predicting a destination can improve.

An example of a method of extracting a characteristic behavior is a TF·IDF method. In the TF·IDF method, a term frequency (=frequency of occurrences of behaviors being noted/frequency of occurrences of all behaviors) of each behavior in the past predetermined period prior to the present date and time is multiplied by an inverse document frequency (=$\log_2$ (the number of dates in behavior history/the number of dates exhibiting the behavior being noted)) to calculate importance, and the behavior having the importance exceeding the threshold value is extracted as the characteristic behavior from the behavior history.

In addition, the modification of the first embodiment may also be applied to the fourth embodiment.

<D-2. Effects>

The destination prediction apparatus 104 according to the fourth preferred embodiment includes the characteristic behavior extractor 14 that extracts, as the characteristic behavior from the behavior history, the behavior having the multiplication value of the term frequency and the inverse document frequency of the behavior calculated by the TF·IDF method more than or equal to the threshold value. The similar behavior date-and-time extractor 5 performs the similarity determination between the characteristic behavior within the predetermined period prior to the present date and time and the characteristic behavior in another period. The similar behavior date and time are extracted from the characteristic behavior except for the general behaviors, so that the accuracy of predicting a destination cam improve.

<E. Fifth Embodiment>

In the first to fourth embodiments, a destination or a facility type is predicted at the time of departure to support a user to set a destination. On the other hand, the technology of predicting a destination using a travel route of a vehicle has conventionally been conceived in Patent Documents 1, 2. In a fifth embodiment, the destination prediction in the first to fourth embodiments is combined with the destination prediction by the travel route of the conventional technology, thereby performing a destination prediction with higher accuracy.

<E-1. Configuration, Operations>

FIG. 27 is a block diagram showing a configuration of a destination prediction apparatus 105 in a fifth embodiment.

The destination prediction apparatus 105 includes a destination predicting unit 15 that performs a destination prediction by a travel route of the conventional technology in addition to the configuration of the destination prediction apparatus 102 in the second embodiment. In FIG. 27, the same structural components as or structural components corresponding to those of the destination prediction apparatus 102 shown in FIG. 8 have the same reference numerals.

The destination predicting unit 15 acquires current location information of a vehicle from the position detector 1 at regular intervals, for example, and records the travel route from the departure of the vehicle to the current location. Moreover, the destination predicting unit 15 acquires destination candidates or their facility types from the association degree determining unit 11.

The association degree determining unit 11 also outputs the destination candidates or their facility types generated by an association degree determining process to the destination predicting unit 15 other than the display information generator 7. The destination predicting unit 15 predicts a destination on the basis of the travel route, thereby performing the prediction after the vehicle travels a distance to some extent. Therefore, similarly to the second embodiment, the destination candidates or their facility types output by the association degree determining unit 11 are the prediction results of the destination prediction apparatus 105 until the destination predicting unit 15 performs the prediction, such as at the time of departure.

For example, when the travel distance of the vehicle exceeds the threshold value and the travel route is sufficient for the destination prediction in the destination predicting unit 15, the destination predicting unit 15 compares destination candidates predicted from the travel route with the destination candidates or their facility types acquired from the association degree determining unit 11, predicts the destination candidate satisfying both of them as a destination, and outputs the destination to the display information generator 7. In addition, for a destination candidate determined to be only one in the association degree determining process of the association degree determining unit 11, the destination candidate is output to the display information generator 7, and the setting of the destination may be performed without the destination prediction by the destination predicting unit 15.

The display information generator 7 acquires the prediction result of the destination from the destination predicting unit 15 and then generates a map display screen of the location or a screen that notifies the user that the location is set as the destination. For the plurality of locations predicted as destinations, a list display screen of the locations may be generated for the user to select any of the locations as a destination.

According to the configuration as described above, the accuracy of predicting a destination can further improve by outputting the prediction result of the destination such that the user can easily set the destination at the time of departure similarly to the second embodiment and also by combining the destination prediction using the behavior history and the destination prediction using the travel route after the travel of the vehicle.

In addition, as described above, the destination prediction apparatus 105 in the fifth embodiment is described as the example of combining the second embodiment with the destination prediction by the travel route, and the first, third, fourth embodiments may be combined with the destination prediction by the travel route. For the first embodiment combined with the destination prediction by the travel route, among destination candidates extracted by the destination candidate extractor 6, a destination candidate that matches the destination candidate predicted by the travel route is output as the prediction result of the destination to the display device 30.

In addition, the modification of the first embodiment may also be applied to the fourth embodiment.

<E-2. Effects>

The destination prediction apparatus 105 according to the fifth preferred embodiment includes the destination predicting unit 15 that predicts the destination by using the travel route, and the destination prediction apparatus 105 combines the prediction result of the destination by using the behavior history with the prediction result of the destination by using the travel route to predict the destination. Thus, the destination can be predicted with high accuracy. Upon departure, the destination is predicted only from the behavior history, so that the user can easily set the destination.

In addition, according to the present invention, the above embodiments can be arbitrarily combined. Each embodiment can be appropriately varied or omitted within the scope of the invention.

While the invention has been shown and described in detail, the foregoing description is in all aspects illustrative and not restrictive. The present invention is not restricted to that. It is therefore understood the numerous modifications and variations can be devised without departing from the scope of the invention.

DESCRIPTION OF NUMERALS

1 position detector; 2 arrival determining unit; 3 visit history acquiring unit; 4 behavior history acquiring unit; 5 similar behavior date-and-time extractor; 6 destination candidate extractor; 7 display information generator; 8 facility type acquiring unit; 9 record determining unit; 10 facility type list generator; 11 association degree determining unit; 12 behavior recorder; 13 information searching unit; 14 characteristic behavior extractor; 15 destination predicting unit; 20 visit history DB; 21, 21A, 21B, 21C behavior history DB; 22 behavior-location DB; 23 behavior-type DB; 24 local visit history DB; 25 local behavior history DB; 30 display device; 31 input device; 100, 101, 102, 103, 104, 105 destination prediction apparatus.

The invention claimed is:

1. A destination prediction apparatus, comprising:
   a behavior history receiver to receive, from a behavior history database in which a behavior history associating a behavior of a user with a date and time is recorded, said behavior history;
   a visit history receiver to receive, from a visit history database in which a visit history associating a visit location of a mobile body with a date and time is recorded, said visit history;
   a processor configured to execute a program; and
   a memory to store the program which, when executed by the processor, results in performance of steps comprising,
   performing a similarity determination between a behavior within a predetermined period prior to a present date and time and a behavior in another period with reference to said behavior history,
   extracting a date and time of said behavior in another period determined to be similar as a similar behavior date and time from said behavior history, and
   extracting, as a destination candidate, a location visited within a predetermined period before or after said similar behavior date and time from said visit history.

2. The destination prediction apparatus according to claim 1, further comprising said visit history database in which said visit history is recorded,
   wherein said visit history receiver receives said visit history from said visit history database included in said destination prediction apparatus.

3. The destination prediction apparatus according to claim 1, further comprising said behavior history database in which said behavior history is recorded,
   wherein said behavior history receiver receives said behavior history from said behavior history database included in said destination prediction apparatus.

4. The destination prediction apparatus according to claim 1, further comprising:
   said visit history database in which said visit history is recorded; and
   said behavior history database in which said behavior history is recorded, wherein
   said visit history receiver receives said visit history from said visit history database included in said destination prediction apparatus, and
   said behavior history receiver receives said behavior history from said behavior history database included in said destination prediction apparatus.

5. The destination prediction apparatus according to claim 1, wherein said behavior history includes at least one of a scheduler, a history of keyword search on the Web, a web page browsing history, a history of incoming and outgoing calls, a history of transmission and reception of e-mail messages, a life log, and a history of SNS transmission.

6. The destination prediction apparatus according to claim 1, wherein said performing performs said similarity determination again by extending said predetermined period or lowering standards for similarity determination in a case where the number of extractions of said similar behavior date and time is less than a threshold value.

7. The destination prediction apparatus according to claim 1, wherein said performing performs said similarity determination again by shortening said predetermined period or raising standards for similarity determination in a case where the number of extractions of said similar behavior date and time is more than or equal to a threshold value.

8. The destination prediction apparatus according to claim 1, wherein
   said program, when executed by said processor, results in performance of steps further comprising generating display information for displaying said destination candidate on a display device,
   said extracting a destination candidate counts the number of extractions in a case where the same location is extracted as said destination candidate a plurality of times, and
   said generating generates said display information in which a plurality of said destination candidates are arranged in order of said number of extractions.

9. The destination prediction apparatus according to claim 1, wherein
   said program, when executed by said processor, results in performance of steps comprising,
   predicting a destination or its type from said destination candidate extracted in said extracting, and
   generating display information for notifying a user of said destination or said type predicted in said predicting.

10. The destination prediction apparatus according to claim 9, wherein
    said extracting a destination candidate counts the number of extractions in a case where the same location is extracted as said destination candidate a plurality of times, and
    said predicting predicts said destination candidate as a destination when said total number of extractions of all of said destination candidates is more than or equal to a first threshold value and a percentage of said number of extractions in said total number of extractions of all of said destination candidates is more than or equal to a second threshold value.

11. The destination prediction apparatus according to claim 9, wherein
    said extracting a destination candidate counts the number of extractions in a case where the same location is extracted as said destination candidate a plurality of times, and
    said predicting predicts all of said destination candidates as destinations in a case where said total number of extractions of all of said destination candidates is less than a first threshold value.

12. The destination prediction apparatus according to claim 9, further comprising
    a facility type receiver to receive a facility type of said destination candidate, wherein
    said program, when executed by said processor, results in performance of steps further comprising
    calculating said number of extractions of said destination candidate for each facility type,
    said extracting a destination candidate counts the number of extractions in a case where the same location is extracted as said destination candidate, and
    said predicting acquires said facility type of each of said destination candidates in a case where said number of extractions is more than or equal to a first threshold value and a percentage of said number of extractions of any of said destination candidates in said total number of extractions of all of said destination candidates is less than a second threshold value, and predicts said facility type as a facility type of a destination when said number of extractions for each facility type is more than or equal to a threshold value.

13. The destination prediction apparatus according to claim 9, further comprising
    a facility type receiver to receive a facility type of said destination candidate, wherein
    said program, when executed by said processor, results in performance of steps further comprising
    calculating said number of extractions of said destination candidate for each facility type,
    said extracting a destination candidate counts the number of extractions in a case where the same location is extracted as said destination candidate, and
    said predicting acquires said facility type of each of said destination candidates in a case where said number of extractions is more than or equal to a first threshold value and a percentage of said number of extractions of any of said destination candidates in said total number of extractions of all of said destination candidates is less than a second threshold value, and predicts all of said facility types as facility types of destinations when said number of extractions for each facility type is less than a threshold value.

14. The destination prediction apparatus according to claim 1, wherein said program, when executed by said processor, results in performance of steps further comprising recording a current location as said visit location in said visit history database on the basis of at least any states of an engine, a gear, and a side break of said mobile body.

15. The destination prediction apparatus according to claim 1, wherein
   said program, when executed by said processor, results in performance of steps further comprising extracting, as a characteristic behavior from said behavior history, a behavior having a multiplication value of a term frequency and an inverse document frequency of the behavior calculated by a TF·IDF method more than or equal to a threshold value, and
   said extracting a date and time of said behavior performs said similarity determination between said characteristic behavior within the predetermined period prior to the present date and time and said characteristic behavior in another period.

16. The destination prediction apparatus according to claim 1, wherein said extracting a date and time of said behavior for no behavior within the predetermined period prior to the present date and time in said behavior history sets, as a similar behavior period, a period in which there is no behavior for said predetermined period or more before said predetermined period prior to the present date and time in said behavior history, and extracts a specific date and time determined in said similar behavior period as said similar behavior date and time.

17. The destination prediction apparatus according to claim 1 further comprising a behavior-location database to associate behavior details of said behavior history with said destination candidate when said mobile body arrives at said destination candidate, said behavior history being a source from which said destination candidate is extracted,
   wherein said predicting, in a case where the past predetermined period prior to the present date and time includes the same behavior details recorded in said behavior history as behavior details entered in said behavior-location database, predicts, as a destination, a location associated with the behavior details in said behavior-location database.

18. The destination prediction apparatus according to claim 1, further comprising:
   a facility type receiver to receive a facility type of said destination candidate; and
   a behavior-type database in which behavior details of said behavior history and said facility type are entered when said mobile body arrives at a location belonging to said facility type of said destination candidate, said behavior history being a source from which said destination candidate is extracted,
   wherein said predicting, in a case where the past predetermined period prior to the present date and time includes the same behavior details recorded in said behavior history as behavior details entered in said behavior-type database, predicts, as a facility type of a destination, said facility type associated with the behavior details in said behavior-type database.

19. The destination prediction apparatus according to claim 1, wherein said extracting a date and time of said behavior for said behavior history that indicates each behavior in a character string performs a morphological analysis on said character string to perform said similarity determination from words or a combination of words.

20. The destination prediction apparatus according to claim 1, further comprising:
   a local behavior history database in which said behavior history acquired by said behavior history acquiring unit is recorded; and
   a local visit history database in which said visit history acquired by said visit history acquiring unit is recorded.

\* \* \* \* \*